US010368059B2

(12) United States Patent
Fateh et al.

(10) Patent No.: US 10,368,059 B2
(45) Date of Patent: Jul. 30, 2019

(54) METHOD AND APPARATUS FOR INDIVIDUALIZED THREE DIMENSIONAL DISPLAY CALIBRATION

(71) Applicant: Atheer, Inc., Mountain View, CA (US)

(72) Inventors: Sina Fateh, Mountain View, CA (US); Nathan Abercrombie, Oakland, CA (US); Sleiman Itani, East Palo Alto, CA (US)

(73) Assignee: Atheer, Inc., Mountain View, CA (US)

( * ) Notice: Subject to any disclaimer, the term of this patent is extended or adjusted under 35 U.S.C. 154(b) by 370 days.

(21) Appl. No.: 14/874,313

(22) Filed: Oct. 2, 2015

(65) Prior Publication Data

US 2017/0099482 A1 Apr. 6, 2017

(51) Int. Cl.

| | |
|---|---|
| ***H04N 13/122*** | (2018.01) |
| ***G02B 27/01*** | (2006.01) |
| ***H04N 13/327*** | (2018.01) |
| ***H04N 13/332*** | (2018.01) |
| ***H04N 13/383*** | (2018.01) |
| ***H04N 13/344*** | (2018.01) |
| ***H04N 13/128*** | (2018.01) |

(52) U.S. Cl.

CPC ....... *H04N 13/327* (2018.05); *G02B 27/0172* (2013.01); *H04N 13/128* (2018.05); *H04N 13/332* (2018.05); *H04N 13/344* (2018.05); *H04N 13/383* (2018.05); *G02B 2027/0134* (2013.01); *G02B 2027/0138* (2013.01); *G02B 2027/0178* (2013.01); *H04N 2213/002* (2013.01)

(58) Field of Classification Search

CPC ............. H04N 13/0425; H04N 13/044; H04N 13/0022; H04N 2213/002; H04N 13/0484; H04N 13/0429; G02B 27/0172; G02B 2027/0138; G02B 2027/0134; G02B 2027/0178

See application file for complete search history.

(56) References Cited

U.S. PATENT DOCUMENTS

| | | | | |
|---|---|---|---|---|
| 5,677,501 A * | 10/1997 | Kawaguchi | G01D 7/08 | 73/866.3 |
| 6,795,019 B2 * | 9/2004 | Holt | G01S 5/02 | 342/174 |
| 7,164,117 B2 * | 1/2007 | Breed | B60R 21/01516 | 250/208.1 |

(Continued)

*Primary Examiner* — Sathyanaraya V Perungavoor
*Assistant Examiner* — Philip P. Dang
(74) *Attorney, Agent, or Firm* — Mohr Intellectual Property Law Solutions, PC

(57) ABSTRACT

A target is outputted to an ideal position in 3D space. A viewer indicates the apparent position of the target, and the indication is sensed. An offset between the ideal and apparent positions is determined, and an adjustment determined from the offset such that the apparent position of the ideal position with the adjustment matches the ideal position without the adjustment. The adjustment is made to the first entity and/or a second entity, such that the entities appear to the viewer in the ideal position. The indication may be monocular with a separate indication for each eye, or binocular with a single viewer indication for both eyes. The indication also may serve as communication, such as a PIN input, so that calibration is transparent to the viewer. The method may be continuous, intermittent, or otherwise ongoing over time.

52 Claims, 13 Drawing Sheets

(56) References Cited

U.S. PATENT DOCUMENTS

| | | | | | |
|---|---|---|---|---|---|
| 7,414,596 | B2 * | 8/2008 | Satoh | G01C 9/00 | 345/158 |
| 7,663,502 | B2 * | 2/2010 | Breed | B60C 11/24 | 340/12.25 |
| 7,706,625 | B2 * | 4/2010 | Friedrich | G06T 5/20 | 382/260 |
| 8,467,133 | B2 * | 6/2013 | Miller | G02B 27/017 | 353/28 |
| 8,547,422 | B2 * | 10/2013 | Surman | G02B 27/225 | 348/54 |
| 8,553,935 | B2 * | 10/2013 | Mandella | G01B 21/04 | 382/103 |
| 8,581,892 | B2 * | 11/2013 | Yoshida | G06F 3/0428 | 345/207 |
| 8,676,937 | B2 * | 3/2014 | Rapaport | H04L 51/32 | 709/219 |
| 8,933,886 | B2 * | 1/2015 | Imoto | G06F 3/013 | 345/158 |
| 9,030,443 | B2 * | 5/2015 | Yoshida | G06F 3/0416 | 345/175 |
| 9,098,137 | B2 * | 8/2015 | Nakanishi | G06F 3/0416 | |
| 9,141,235 | B2 * | 9/2015 | Nakanishi | G06F 3/0428 | |
| 2003/0120183 | A1 * | 6/2003 | Simmons | A61F 4/00 | 600/595 |
| 2005/0195158 | A1 * | 9/2005 | Wilke | G06F 3/017 | 345/156 |
| 2008/0231926 | A1 * | 9/2008 | Klug | G06F 3/017 | 359/23 |
| 2009/0312595 | A1 * | 12/2009 | Leuthardt | G06F 19/3481 | 600/27 |
| 2010/0125561 | A1 * | 5/2010 | Leuthardt | G06F 19/3481 | 707/706 |
| 2011/0122131 | A1 * | 5/2011 | Bruls | H04N 19/597 | 345/419 |
| 2012/0005624 | A1 * | 1/2012 | Vesely | G06F 3/012 | 715/808 |
| 2012/0120498 | A1 * | 5/2012 | Harrison | G02B 3/08 | 359/630 |
| 2012/0154920 | A1 * | 6/2012 | Harrison | G02B 3/0056 | 359/619 |
| 2013/0257849 | A1 * | 10/2013 | Doherty | H04N 13/0429 | 345/419 |
| 2014/0160250 | A1 * | 6/2014 | Pomerantz | H04N 5/23229 | 348/47 |
| 2014/0184496 | A1 * | 7/2014 | Gribetz | G02B 27/017 | 345/156 |
| 2014/0200079 | A1 * | 7/2014 | Bathiche | A63F 13/00 | 463/32 |
| 2014/0243614 | A1 * | 8/2014 | Rothberg | A61B 8/13 | 600/301 |
| 2014/0285429 | A1 * | 9/2014 | Simmons | G02B 27/225 | 345/156 |
| 2015/0029180 | A1 * | 1/2015 | Komatsu | G06T 19/006 | 345/419 |

* cited by examiner

METHOD AND APPARATUS FOR INDIVIDUALIZED THREE DIMENSIONAL DISPLAY CALIBRATION

FIELD OF THE INVENTION

This invention relates to output of three dimensional images. More particularly, this invention relates to approaches for individually calibrating a three dimensional display system such as a stereo display system to accommodate a viewer's particular visual parameters.

DESCRIPTION OF RELATED ART

Humans perceive depth in part through stereo vision, noting the difference in perspective between the left and right eyes when viewing the physical world. Stereo displays take advantage of this feature: by displaying different images to the left and right eyes, depth can be portrayed even if both images are two-dimensional.

However, human vision may not be uniform from one individual to another, and/or for an individual over time. For example, differences in geometry—such as the spacing between a person's eyes, the relative positions of the eyes, the physical structures of the eyes, the alignment of the eyes with one another, etc.—can affect the way a scene appears to an individual. Thus, individuals viewing a physical scene may perceive that scene differently, based on the particulars of each individual's eyes. Even if two people both perceive an object to be at a distance of (for example) 50 cm, what those two people see in making that determination may vary.

Because of this, a "one size fits all" stereo display configuration may be problematic. Displayed imagery that does not correspond with what a viewer sees when looking at a physical environment may consciously or unconsciously be perceived as unrealistic or unconvincing. In addition, variations in how a stereo display scene appears compared with how the physical world appears—from the viewer's perspective, errors (or at least apparent errors) in how the scene is displayed—may contribute (again, with or without the viewer's awareness) to issues such as disorientation, eyestrain, nausea, etc.

BRIEF SUMMARY OF THE INVENTION

The present invention contemplates a variety of systems, apparatus, methods, and paradigms for calibrating three dimensional display systems to individual viewers.

In one embodiment of the present invention, a machine-implemented method is provided that includes, in a processor, outputting a first entity in an ideal position in three-dimensional space, and sensing a viewer indication of an apparent position of the first entity. The method also includes determining an offset between the ideal position and the apparent position, and determining an adjustment from the offset, such that an apparent position of the ideal position with the adjustment is substantially similar to the ideal position absent the adjustment. Thereafter the adjustment is applied the first entity and/or a second entity.

Outputting the first entity in the ideal position may include outputting the first entity to first and second displays of a stereo display pair. Outputting the first entity in the ideal position may include outputting the first entity in a first ideal position to a first display of a stereo display pair, and outputting the first entity in a second ideal position to a second display of the stereo display pair. The first and second ideal positions may be substantially two-dimensional.

Outputting the first entity in the ideal position may include outputting the first entity in a first ideal position to a first eye of the viewer but not a second eye of the viewer, and outputting the first entity in a second ideal position to the second eye of the viewer but not the first eye of the viewer.

The method may include outputting the first entity substantially simultaneously to the first eye and the second eye, wherein sensing the viewer indication of the apparent position of the first entity comprises sensing a substantially simultaneous viewer first indication of a first apparent position of the first entity to the first eye and viewer second indication of a second apparent position of the first entity to the second eye.

The method may include outputting the first entity sequentially to the first eye and the second eye, wherein sensing the viewer indication of the apparent position of the first entity comprises sequentially sensing a viewer first indication of a first apparent position of the first entity to the first eye, and a viewer second indication of a second apparent position of the first entity to the second eye.

The method may include outputting substantially nothing to the second eye while outputting the first entity to the first eye, and outputting substantially nothing to the first eye while outputting the first entity to the second eye. The method may include substantially obstructing the second eye while outputting the first entity to the first eye, and substantially obstructing the first eye while outputting the first entity to the second eye.

The viewer indication may include a viewer posture and/or a viewer gesture. The viewer indication may include the viewer substantially aligning an end-effector with the apparent position of the first entity.

The viewer first indication may include the viewer substantially aligning a first end-effector with the first apparent position of the first entity, and the viewer second indication may include the viewer substantially aligning the first end-effector with the second apparent position of the first entity, substantially simultaneously to the viewer substantially aligning the first end-effector with the first apparent position of the first entity.

The viewer first indication may include the viewer substantially aligning a first end-effector with the first apparent position of the first entity, and the viewer second indication may include the viewer substantially aligning the first end-effector with the second apparent position of the first entity.

The viewer first indication may include the viewer substantially aligning a first end-effector with the first apparent position of the first entity, and the viewer second indication may include the viewer substantially aligning a second end-effector with the second apparent position of the first entity.

The entity may include a virtual reality entity and/or an augmented reality entity.

The method may include outputting the first entity to a stereo display. The method may include outputting the first entity to a see-through display.

The method may include sensing the viewer indication of the apparent position through stereo imaging. The method may include sensing the viewer indication of the apparent position through depth imaging.

The viewer indication may include a viewer communication with the processor in addition to the indication of the apparent position. The viewer communication may include: activating a device in communication with the processor, activating a data entity comprising executable instructions instantiated on the processor, waking the device in communication with the processor, waking the data entity comprising executable instructions instantiated on the processor, unlocking the device in communication with the processor, unlocking the data entity comprising executable instructions instantiated on the processor, addressing the device in communication with the processor, addressing the data entity comprising executable instructions instantiated on the processor, identifying a user of the device in communication with the processor, identifying the user of the data entity comprising executable instructions instantiated on the processor, entering a security verification for the device in communication with the processor, and/or entering the security verification for the data entity comprising executable instructions instantiated on the processor.

In another embodiment of the present invention, a machine-implemented method is provided that includes, in a processor, establishing a substantially three-dimensional combined ideal position, determining from the combined ideal position a substantially two-dimensional first ideal position for a first display of a stereo display pair, and determining from the combined ideal position a substantially two-dimensional second ideal position for a second display of the display stereo pair. The method also includes outputting a first entity substantially to the first ideal position in the first display, and outputting the first entity substantially to the second ideal position in the second display. The method further includes sensing a viewer indication of an apparent position, determining a first position offset substantially representing a difference between the apparent position and the first ideal position, determining a second position offset substantially representing a difference between the apparent position and the second ideal position, and determining an adjustment for the combined ideal position from the first and second position offsets, such that an apparent position of the combined ideal position with the adjustment is substantially similar to the ideal position absent the adjustment. The method includes applying the adjustment to a three dimensional position of the first entity and/or a second entity, and outputting the first entity and/or second entity with the adjustment applied thereto to the stereo display pair.

The method may include sequentially outputting the first and second entities, outputting the first entity in the first display while not outputting the second target in the second display, and outputting the second entity in the second display while not outputting the first target in the first display. The method may include outputting the first target in the first display while outputting substantially nothing in the second display, and outputting the second target in the second display while outputting substantially nothing in the first display. The method may include outputting the first target in the first display while substantially obstructing the second display, and outputting the second target in the second display while substantially obstructing the first display.

Sensing the viewer indication may include sensing a viewer first indication of the first target and a viewer second indication of the second target.

The method may include outputting the first target in the first display and substantially simultaneously outputting the second target in the second display.

Sensing the viewer indication may include sensing substantially simultaneous indication of the first and second targets.

The viewer indication may include a viewer posture and/or a viewer gesture. The viewer indication may include the viewer substantially aligning an end-effector with the apparent position of the first entity.

The viewer first indication may include the viewer substantially aligning a first end-effector with the first apparent position of the first entity, and the viewer second indication may include the viewer substantially aligning the first end-effector with the second apparent position of the first entity, substantially simultaneously to the viewer substantially aligning the first end-effector with the first apparent position of the first entity.

The viewer first indication may include the viewer substantially aligning a first end-effector with the first apparent position of the first entity, and the viewer second indication may include the viewer substantially aligning the first end-effector with the second apparent position of the first entity.

The viewer first indication may include the viewer substantially aligning a first end-effector with the first apparent position of the first entity, and the viewer second indication may include the viewer substantially aligning a second end-effector with the second apparent position of the first entity.

The viewer first indication may include the viewer substantially aligning a first end-effector with the first apparent position of the first entity, and the viewer second indication may include the viewer substantially aligning the first end-effector with the second apparent position of the first entity, substantially simultaneously to the viewer substantially aligning the first end-effector with the first apparent position of the first entity.

The entity may include a virtual reality entity and/or an augmented reality entity.

The first and second displays are see-through displays.

The method may include sensing the viewer indication of the apparent position through stereo imaging. The method may include sensing the viewer indication of the apparent position through depth imaging.

In another embodiment of the present invention, an apparatus is provided that includes a processor, a 3D display in communication with the processor, the display being adapted to output a first entity at an ideal position, and a sensor in communication with the processor, the sensor being adapted to determine a viewer indication of an apparent position of the first entity. An offset determiner is instantiated on the processor, the offset determiner including executable instructions, the difference determiner being adapted to determine an offset between the ideal position and the apparent position. An adjustment determiner is instantiated on the processor, the adjustment determiner including executable instructions, the adjustment determiner being adapted to determine an adjustment from the offset such that an apparent position of the ideal position with the adjustment is substantially similar to the ideal position absent the adjustment. An adjustment applier is instantiated on the processor, the adjustment applier including executable instructions, the adjustment applier being adapted to apply the adjustment to at least one of a group consisting of the first entity and a second entity.

The display may be a stereo display. The display may be a see-through display. The sensor may include an imager. The sensor may include a stereo imager pair. The sensor may include a depth sensor and/or depth imager. The processor, the display, and the sensor may be disposed on a head-mounted display.

In another embodiment of the present invention, an apparatus is provided that includes a processor, a stereo display pair in communication with the processor, the stereo display pair comprising first and second displays, the stereo display pair being adapted to output at least one entity, and a sensor in communication with the processor, the sensor being adapted to determine a viewer indication of an apparent position. A position establisher is instantiated on the processor, the position establisher including executable instructions, the position establisher being adapted to establish a substantially three-dimensional combined ideal position. A stereo position determiner instantiated on the processor, the stereo position determiner including executable instructions, the stereo position determiner being adapted to determine a substantially two-dimensional first ideal position in the first display substantially corresponding with the combined ideal position, and to determine a substantially two-dimensional second ideal position for in the second display substantially corresponding with the combined ideal position. An outputter is instantiated on the processor, the outputter including executable instructions, the outputter being adapted to output a first target substantially to the first ideal position in the first display, and to output a second target substantially to the second ideal position in the second display. An offset determiner is instantiated on the processor, the offset determiner including executable instructions, the offset determiner being adapted to determine a first position offset substantially representing a difference between the apparent position and the first ideal position, and to determine a second position offset substantially representing a difference between the apparent position and the second ideal position. An adjustment determiner is instantiated on the processor, the adjustment determiner including executable instructions, the adjustment determiner being adapted to determine an adjustment for the combined ideal position from the first and second position offsets such that an apparent position of the ideal position with the adjustment is substantially similar to the ideal position absent the adjustment. An adjustment applier is instantiated on the processor, the adjustment applier including executable instructions, the adjustment applier being adapted to apply the adjustment to at least one the entity.

The first and second displays may be see-through displays. The sensor may include an imager. The sensor may include a stereo imager pair. The sensor may include a depth sensor and/or depth imager.

In another embodiment of the present invention, an apparatus is provided that includes means for establishing a substantially three-dimensional combined ideal position, means for determining from the combined ideal position a substantially two-dimensional first ideal position for a first display of a stereo display pair, and means for determining from the combined ideal position a substantially two-dimensional second ideal position for a second display of the display stereo pair. The apparatus includes means for outputting a first target substantially to the first ideal position in the first display, means for outputting a second target substantially to the second ideal position in the second display. The apparatus also includes means for sensing a viewer indication of an apparent position, means for determining a first position offset substantially representing a difference between the apparent position and the first ideal position, means for determining a second position offset substantially representing a difference between the apparent position and the second ideal position, and means for determining an adjustment, such that an apparent position of the ideal position with the adjustment is substantially similar to the ideal position absent the adjustment. The apparatus further includes means for applying the adjustment to a three dimensional position of at least one output entity; and means for outputting the at output entity to the stereo display pair.

In another embodiment of the present invention, a method is provided that includes outputting to a stereo display of a head mounted display a calibration target in an ideal position in three-dimensional space. The method includes sensing with a depth imager of the head mounted display a viewer indication of the apparent position of the first entity, determining computationally in a processor of the head mounted display an offset between the ideal position and the apparent position, and determining computationally in the processor an adjustment from the offset such that the apparent position of the ideal position with the adjustment is substantially similar to the ideal position absent the adjustment. The method also includes thereafter applying the adjustment in the processor to the calibration target and/or a data entity, and outputting the calibration target and/or data entity with the adjustment applied thereto to the stereo display.

In another embodiment of the present invention, a method is provided that includes, in a processor of a head mounted display, computationally determining a substantially three-dimensional combined ideal position for a calibration target, and in the processor computationally determining from the combined ideal position a substantially two-dimensional first ideal position for a first display of a stereo display pair of the head mounted display, and in the processor computationally determining from the combined ideal position a substantially two-dimensional second ideal position for a second display of the stereo display pair. The method includes outputting said target substantially to the first ideal position in said first display, outputting the target substantially to the second ideal position in the second display, and sensing with a sensor of the head mounted display a viewer indication of an apparent position of the target. The method also includes in the processor computationally determining a first position offset substantially representing a difference between the apparent position and the first ideal position, in the processor computationally determining a second position offset substantially representing a difference between the apparent position and the second ideal position, and in the processor computationally determining an adjustment for the combined ideal position from the first and second position offsets, such that an apparent position of said combined ideal position with said adjustment is substantially similar to said ideal position absent said adjustment. The method further includes in the processor applying the adjustment to a three dimensional position of the target, and outputting the calibration target with the adjustment applied thereto to the stereo display pair.

BRIEF DESCRIPTION OF THE SEVERAL VIEWS OF THE DRAWINGS

Like reference numbers generally indicate corresponding elements in the figures.

DETAILED DESCRIPTION OF THE INVENTION

Figure 1:
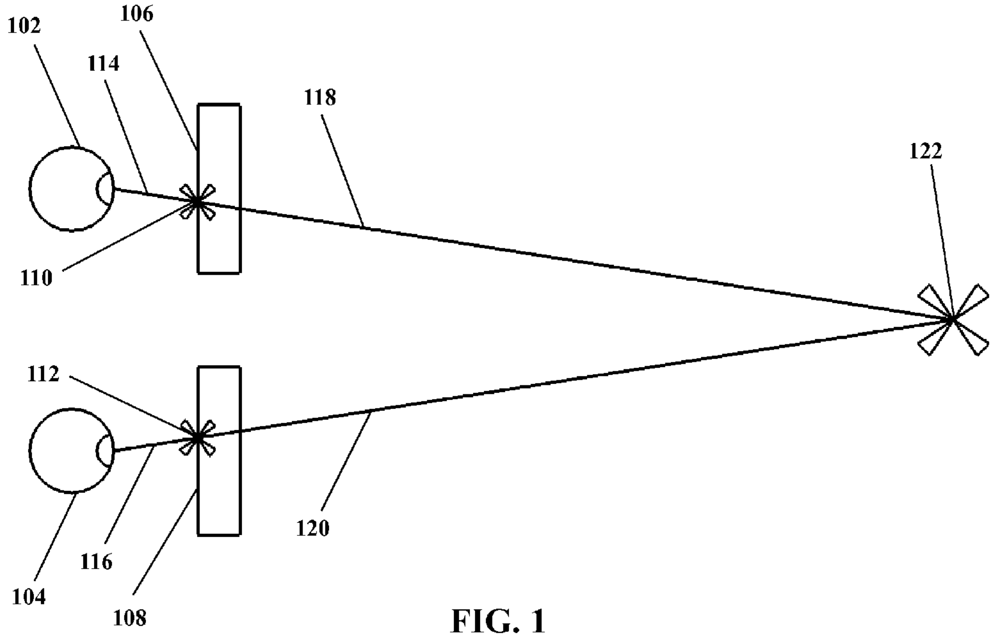
FIG. 1 shows a top down schematic for an example three dimensional display system according to the present invention, with an example inter-pupillary distance and apparent position.

With reference to FIG. 1, a top down schematic for a three dimensional display system is shown therein. Left and right eyes 102 and 104 are shown, with left and right displays 106 and 108 of a three dimensional display system (as shown a stereo display, though this is an example only) disposed in front of the left and right eyes 102 and 104 respectively. Left and right images 110 and 112 are outputted to the displays 106 and 108. Sight lines 114 and 116 are shown extending from the eyes 102 and 104 to the images 110 and 112.

Because the images 110 and 112 are outputted to the displays 106 and 108, sight lines 114 and 116 to the images 110 and 112 terminate at the displays 106 and 108. However, human stereo vision typically combines the two images 110 and 112, interpreting images 110 and 112 as a single target 122. The position of the target 122 is determined by extending virtual sight lines 118 and 120 from the sight lines 114 and 116 to a point of convergence. Thus even though the images 110 and 112 themselves may be substantially or entirely two-dimensional, and/or constrained to positions in two-dimensional space (e.g. displayed on two-dimensional surfaces), entities appearing to a viewer as being three-dimensional and/or as being in three-dimensional space (e.g. at some depth different from the distance to the two-dimensional displays) nevertheless may be displayed.

Figure 2:
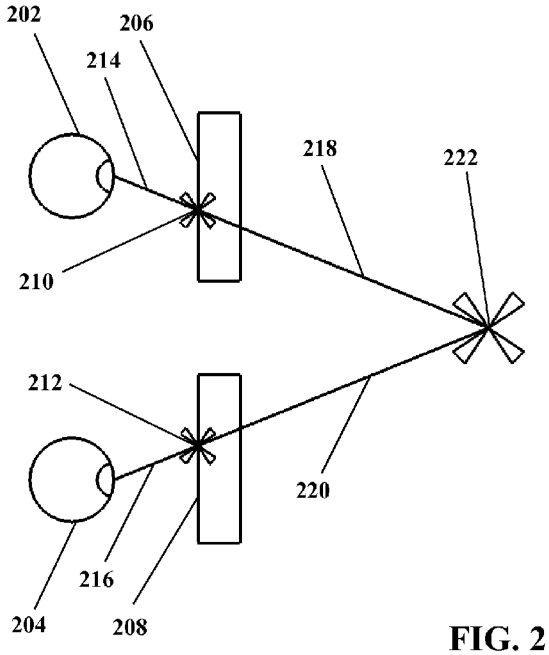
FIG. 2 shows a top down schematic for another example three dimensional display system according to the present invention, with a different inter-pupillary distance and apparent position from FIG. 1.

Turning to FIG. 2, another top down schematic for a three dimensional display system is shown therein. As in FIG. 1, left and right eyes 202 and 204 are shown in FIG. 2. However, as may be seen the eyes 202 and 204 in FIG. 2 are farther apart from one another than the eyes 102 and 104 in FIG. 1. The spacing between eyes may be referred to as the inter-pupillary distance or IPD, i.e. the distance between the centers of the pupils. Inter-pupillary distance may vary significantly between individuals. For example, while a mean for young adult U.S. males is approximately 65 millimeters, values as low as 52 mm or as high as 78 mm are not unknown, and greater extremes may exist. Inter-pupillary distance also may vary with age (typically being smaller in children than in adults), due to certain injuries, etc. It is noted that the inter-pupillary distance in FIG. 2 is about 15% greater than that in FIG. 1, while the maximum real-world value of 78 mm cited above is 50% greater than the minimum real-world value of 52 mm cited above. Thus the variation between FIG. 1 and FIG. 2 is not necessarily an exaggeration beyond anticipated human anatomical norms in that regard.

Continuing in FIG. 2, left and right displays 206 and 208 of a three dimensional display system are disposed in front of the left and right eyes 202 and 204, with left and right images 210 and 212 outputted thereto. Sight lines 214 and 216 extend from the eyes 202 and 204 to the images 210 and 212, and virtual sight lines 218 and 220 converge such that a viewer would see a target 222 at a location in three dimensional space.

As may be seen by comparison of FIG. 2 with FIG. 1, the distance from the viewer in FIG. 2 (as represented by eyes 202 and 202) to the target 222 therein is visibly less than the distance from the viewer in FIG. 1 to the target 122 therein. As may also be seen by comparison, the size, shape, configuration, and position of the displays 206 and 208 in FIG. 2 are otherwise similar to those of the displays 106 and 108 in FIG. 1, and that the positions of the images 210 and 212 in FIG. 2 are similar to the positions of the images 110 and 112 in FIG. 1. Yet although the display systems in FIG. 1 and FIG. 2 are at least extremely similar, the apparent position of the targets 122 and 222 are visibly quite different; namely, the image 222 in FIG. 2 appears to be at a closer distance than the image 122 in FIG. 1.

Then, when an entity is outputted by a three dimensional system such as a stereo display system, where that entity appears to a viewer may vary from one viewer to the next. In other words, what a viewer perceives as the apparent position of the entity may be different from an ideal or intended position for the entity.

Figure 3:
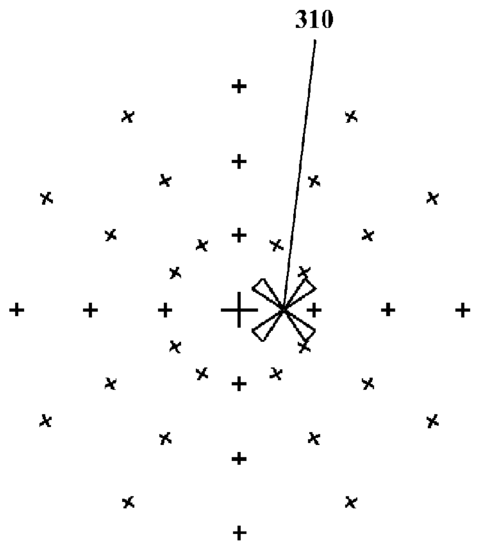
FIG. 3 shows apparent positions of images for the left and right eyes of a viewer, for an example inter-pupillary distance.

Such variation may occur even without three dimensional displays, due for example to factors such as the aforementioned variation in inter-pupillary distance. For example, as may be seen in FIG. 3, a viewer with an inter-pupillary distance and in an arrangement similar to what is shown in FIG. 1 may see image positions similar to 310 and 312 shown in FIG. 3 with his or her left and right eyes. In FIG. 3, the larger center mark represents a perpendicular away from the viewer (i.e. "straight ahead") while the surrounding marks indicate intervals of 15 degrees in various directions. Thus, the left image 310 appears approximately 9 degrees right of perpendicular viewed from the left eye, while the right image 312 appears approximately 9 degrees left of perpendicular viewed from the right eye.

Figure 4:
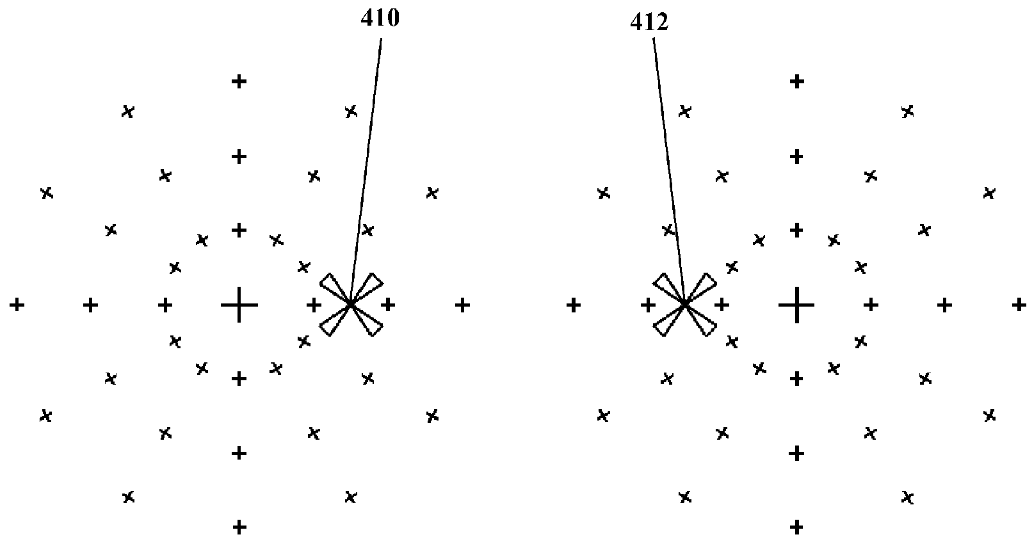
FIG. 4 shows apparent positions of images for the left and right eyes of a viewer, for a different example inter-pupillary distance from FIG. 3.

With reference to FIG. 4, a viewer with an inter-pupillary distance and in an arrangement similar to what is shown in FIG. 2 might see image positions similar to 410 and 412. The left image 410 appears approximately 22 degrees right of perpendicular viewed from the left eye, while the right image 412 appears approximately 22 degrees left of perpendicular viewed from the right eye.

In unassisted human vision, differences such as those visible between FIG. 3 and FIG. 4 may not be of concern; a real-world target in three dimensional space "is where it is", and individuals may learn to judge distances and positions for targets based on the particulars of their own eyes and brain. The precise deflections (and/or the angles of convergence those deflections represent) seen by each eye may vary from person to person, but over time each person may learn (perhaps not consciously) what deflections/angles correspond with what positions in three dimensional space.

However, when entities are displayed without necessarily existing physically, such as may be the case for at least some virtual reality and/or augmented reality content, such individual variations may prove problematic. A display system may output images 110 and 112 as in FIG. 1 with the expectation that the viewer would perceive a target 122 at the distance shown in FIG. 1, based on an idealized assumption that the inter-pupillary distance of the viewer also is as shown in FIG. 1. However, for a viewer with an inter-pupillary distance similar to that in FIG. 2, the apparent position of the target 222 may be as shown in FIG. 2, and thus substantially closer than the ideal position of the target 122 in FIG. 1.

In such instance, to a viewer with an inter-pupillary distance as in FIG. 2 the target 222 may appear much closer than is intended. More broadly, variations in inter-pupillary distance and/or other factors may contribute to a perception by viewers that objects displayed in (for example) virtual reality and/or augmented reality systems are "in the wrong place". Such discrepancies between ideal positions and apparent positions may cause outputted entities to appear differently than is expected, in addition to and/or instead of variations in perceived distance only. Scenes may appear distorted from how they are anticipated to be displayed, for example. More colloquially, the output being displayed may appear "wrong" (even though the viewer may not necessarily be able to identify precisely what is wrong with the output).

Even if relatively small, errors in apparent distance may be problematic. For example, interacting with a three dimensional environment may be more difficult if objects are not at the positions that the viewer expects from the appearance of those objects. This may be particularly significant for three dimensional environments that are relatively rich and sophisticated, e.g. with many objects and/or phenomena displayed therein, objects and/or phenomena moving, affecting one another, etc. In addition, a high level of interactivity and/or opportunity to manipulate such environments, responsiveness to fine control, etc. may contribute to position errors (or at least perceived errors) and so forth being particularly problematic. Furthermore, if an environment is to be realistic, immersive, etc. a discrepancy between where objects "should be" for a given viewer and where they are as far as the three dimensional system is concerned may interfere with the illusion of reality. As has been noted, it is not necessary for such discrepancies to be so pronounced as to be consciously observed by viewers in order to be of potential concern. Although much of human vision may be handled without conscious control or attention (and anomalies may not be immediately apparent at a conscious level), a non-specific sense that "this isn't right" may be problematic even if a viewer is unable to articulate or particularly identify what isn't right.

In addition, if a three dimensional display is intended to provide information that aligns or interacts with a physical environment—for example, augmented reality information overlaid onto the physical world, as might be viewed using a see-through display—even relatively minor differences between perceived position and ideal position may be significant. For instance, an outline intended to highlight a real-world feature such as a street sign may, to the viewer, appear to be slightly misplaced. Besides being a potential cosmetic nuisance, such errors may cause operational problems, for example a misplaced outline might obscure the very sign that the outline was intended to highlight. Likewise, differences in where a viewer perceives a cursor to be and where a controlling processor treats that cursor as being may make using the cursor more difficult.

Furthermore, when from the viewer's perspective displayed features are not where those features appear to be, problems such as disorientation, dizziness, nausea, eye strain, headaches, etc. may occur. If sufficiently severe, such problems may limit the usefulness of a display system, or even render the system effectively unusable in practice for at least some viewers.

Although variations in inter-pupillary distance are used in FIG. 1 through FIG. 4 to illustrate one specific property that may cause and/or contribute to differences between apparent and ideal positions, this is an example only, and other properties also may be significant. Individuals may exhibit variation not only in inter-pupillary distance, but also in eye alignment, in the optical architecture of the eyes themselves, in the behavior of the eyes (i.e. saccadic motion, eye tracking, etc.), in the specifics of brain activity in interpreting images, etc. Furthermore, although the examples in FIG. 1 through FIG. 4 show only variations in deflection along one dimension (the horizontal) for purposes of simplicity, and also only show deflections that are similar for both eyes, individuals may perceive a target as being offset vertically, offset to different degrees and/or in different directions with both eyes, etc.

Furthermore, features that may have no immediately apparent connection to eyesight may affect the apparent position of an entity displayed in three dimensional space. For example, consider an arrangement wherein the entity is displayed using a near-eye head mounted display, such as one resembling glasses, etc. If the head mounted display rests on the viewer's nose and ears, then factors such as the size, shape, and position of the viewer's nose and/or ears may affect where objects are outputted relative to the viewer's eyes, and thus may affect where those objects appear to be in three dimensional space.

Besides anatomical variations, variations the position of a display relative to the eyes of a viewer also may affect the apparent position of entities in three dimensional space. The viewer's preferences in how to use, wear, etc. a display system (such as wearing a head mounted display high on the nose or low on the nose) thus may affect the apparent position of displayed information. For example, a viewer may wear a near-eye head mounted display high up on the bridge of the nose, or farther out near the tip of the nose. This difference in distance between eyes and displays may produce variations in sight lines, thus contributing to differences in sight lines (and thus apparent distances) even for the same viewer looking at the same content; thus, even shifting how a viewer wears or otherwise utilizes a head mounted display from day to day (or moment to moment) may affect the apparent position of content being displayed.

Also, injury and/or illness may produce variations in anatomy, preferred viewing position, etc., that are outside the typical range of healthy individuals.

In principle, a sufficiently detailed optical model for an individual may address such variations, for example by enabling accurate prediction of where that individual will see a target displayed with a three dimensional system. For instance, direct measurement of an individual's optical parameters, for example inter-pupillary distance, might be undertaken. However, such measurements may require some degree of skill to execute properly, may require specialized equipment, may be time-consuming, etc. In addition, a comprehensive list of factors that potentially could affect depth perception may not necessarily be well-defined, and the number of relevant factors also may be very large. A significant amount of time and skilled labor might be required to gather and process such data.

By contrast, in the present invention a determination may be made as to where a viewer in fact sees a target, as opposed to where the viewer is expected to see the target in principle, without necessarily requiring or utilizing detailed measurement or optical modeling.

Figure 5:
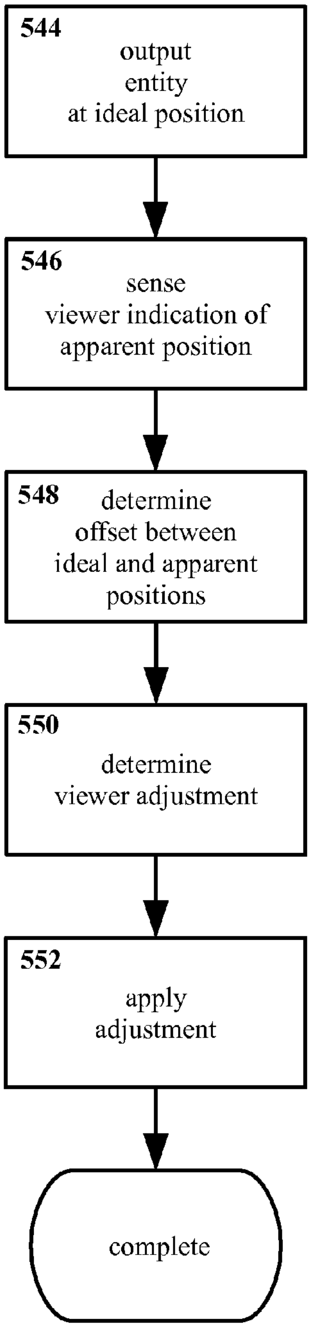
FIG. 5 shows an example method for individualized three dimensional display calibration according to the present invention, in flow-chart form.

With reference now to FIG. 5, an example method for calibrating a display system for an individual user (and/or for an individual set of conditions for a user, etc.) is shown therein in flow-chart form.

In the method shown in FIG. 5 an entity is outputted 544 at an ideal position. The ideal position is a location in three dimensional space at which it is expected the entity will be perceived by a viewer. For example, the entity may be outputted 544 in left and right stereo display screens with a position on each such screen as would ideally correspond with an apparent depth of (for example) 50 centimeters, centered between the viewer's eyes and in a horizontal plane aligned with the viewer's eyes. However, this is an example only, and other ideal positions may be equally suitable.

Typically a single three-dimensional ideal position may be used to determine corresponding two-dimensional positions for left and right eyes. For example, for a known position in three-dimensional space, ideal parallax and ideal positions in two-dimensional space may be calculated geometrically (though perhaps making assumptions regarding optical baseline/inter-pupillary distance and other parameters, which as already noted may vary from one individual to another).

The present invention is not particularly limited in the manner by which the ideal position is determined. Typically, though not necessarily, the ideal position may be determined for some standardized model representative of average optical characteristics.

Continuing in FIG. 5, a viewer indication of an apparent position is sensed 546. That is, the viewer indicates in some fashion where the entity appears, based on the specific properties of his or her eyes, the particulars of the display configuration, etc., and that indication is in some manner determined. It is emphasized that the viewer is not required to know or understand the parameters affecting the apparent position; the viewer is required only to indicate where the entity appears to him/her.

Typically though not necessarily, a viewer may indicate the apparent position of the entity by aligning an end-effector such as a fingertip with the entity. More colloquially, the viewer may point to where the entity appears to him or her.

The indication process may be binocular or monocular (and indeed the method overall may be referred to as binocular or monocular). That is, the viewer may indicate the apparent position of the entity, and that apparent position may be sensed, for either both eyes at the same time (binocular) or for one eye at a time (monocular). These options are discussed in more detail later herein.

It will be understood that whatever approach is used to sense 546 the viewer indication, that approach must either provide or allow the determination of depth information. However, the present invention is not otherwise particularly limited with regard to how the viewer indication may be sensed 546. For certain embodiments, a stereo arrangement of cameras, including but not limited to digital video cameras, may be suitable. For other embodiments a depth camera might be used. Other arrangements, including but not limited to ultrasonic range-finding, active light-pulse range-finding, millimeter radar, etc. may be equally suitable.

Moving on in FIG. 5, a difference between the ideal position and the apparent position is determined 548. As has been described, where a displayed entity is perceived to be located in three dimensional space is different from where that entity "should be" perceived to be located under ideal conditions. Since the ideal position is known (the entity having been displayed at that position) and the apparent position may be determined from the viewer's indication, the difference between those two positions also may be determined.

The present invention is not particularly limited with regard to how the difference is determined 548, or with regard to the manner in which that difference is expressed. For example, the difference might be considered in two dimensions (e.g. if convenient for systems using two dimensional displays) or in three dimensions (e.g. if convenient for a three dimension space being portrayed). The difference might be expressed and considered as a Cartesian coordinate set (e.g. −3 cm along the x axis, +5 cm along the y axis, −11 cm z along the z axis, etc.). Alternately, the difference might be expressed as a direction and magnitude, or in other terms. As yet another alternative the difference might be expressed as two or more values (or vectors, etc.). For example, for a stereo display system a first difference may be determined for the left display and a second difference determined for the right eye, with the combined three-dimensional difference being a result of the two individual differences (the difference might be expressed as one difference for an arrangement wherein a three dimensional position is outputted as a combination of two dimensional positions.

Still with reference to FIG. 5, a viewer-specific adjustment is determined 550 for entities that are and/or will be displayed. That is, based on the difference determined in step 548—where the entity appeared to be relative to where the entity was intended to be—a correction may be determined such that entities are displayed in such fashion that where those entities appear to the viewer and where those entities are intended to be seen more closely match. Stated differently, applying the adjustment to the ideal position results in an apparent (adjusted) position that is substantially similar to the (non-adjusted) ideal position.

Ideally the match between the ideal position on one hand and the apparent position combined with the adjustment on the other hand should be perfect, i.e. the ideal and adjusted apparent positions are identical. However, in practice achieving perfect matching may not be feasible, nor is an identical match necessarily required by the present invention. For certain embodiments it may be sufficient for the ideal and adjusted apparent positions to be similar, or even merely for the difference between the ideal and adjusted apparent positions to be reduced.

With regard to less-than-identical matches, the method as shown in FIG. 5 (as well as other methods shown and described herein, unless otherwise noted) may be used iteratively. That is, the method steps in FIG. 5 may be repeated two or more times, potentially refining/improving the adjustment so as to improve the match between ideal and adjusted apparent positions, compensating for changes in the optical parameters (e.g. if a head mounted display shifts on a viewer's head over time), etc.

Continuing in FIG. 5, the adjustment is then applied 552 to one or more entities being displayed. The adjustment may be applied 552 to the entity that is used to determine the adjustment itself, that is, the already-displayed position of the entity may shift from the ("incorrect") apparent position to a new adjusted apparent position that more closely matches the ideal position. Similarly, the adjustment may be applied 552 to other entities already being displayed to the viewer. In certain embodiments the displayed positions of all or nearly all information being displayed may be modified by applying the adjustment 552, such that the entire display might be considered to recalibrate. However, this is not required, and for certain embodiments it may be equally suitable to apply the adjustment only to entities being newly displayed, or otherwise limit the adjustment only to some entities while not applying the adjustment to other entities.

With regard collectively to FIG. 6 through FIG. 13, therein is shown a sequence as may correspond to at least certain features of an example method for individualized three dimensional display calibration according to the present invention. However, FIG. 6 through FIG. 13 illustrate such features of a method according to the present invention considering perceptions and/or actions as might be seen and/or carried out by a viewer, rather than a flow-chart of individual steps as in FIG. 5.

Figure 6:
FIG. 6 through FIG. 13 show a sequence as might correspond to at least certain features of an example method for individualized three dimensional display calibration according to the present invention, illustrated as might be seen and/or carried out by a viewer.

With regard specifically to FIG. 6, for a three dimensional display system such as a stereo display system a distinction may exist between the ideal position for a displayed entity and the apparent position of that displayed entity, as described previously herein. FIG. 6 shows an example entity outputted for viewing by a viewer at an ideal position 622 in three dimensional space, the viewer of the entity being represented by left and right eyes 602 and 604. The arrangement in FIG. 6 may be considered as at least somewhat similar to that represented by step 544 in FIG. 5. (For purposes of simplicity, display screens, sight lines, etc. are not illustrated in FIG. 6 or in subsequent FIG. 7 through FIG. 12. However, it should be understood that in at least certain embodiments of the present invention, changes in apparent three dimensional position of displayed content may be implemented in whole or in part by changing the actual position of content as displayed in two dimensions, e.g. on two dimensional display screens.

Figure 7:

Turning to FIG. 7, an example entity is again shown outputted for viewing by a viewer at an ideal position 722 in three dimensional space. However, because of the particular parameters of the viewer's eyes 702 and 704, the arrangement of a display outputting the example entity 722, etc., the viewer perceives the example entity as being at an apparent position 724, with the apparent position 724 being different from the ideal position 722. As may be observed, the apparent position 724 as shown in FIG. 7 is shifted to the right of the ideal position 722 from the point of view of the viewer (downward as FIG. 7 is arranged), and is closer to the viewer than the ideal position 722.

It is noted that the particular shift from the ideal position 722 of the entity to the apparent position 724 of the entity as perceived by the viewer that is shown in FIG. 7 is arbitrary, presented for purposes of illustration. As noted previously, many factors may affect apparent position as compared with ideal position, resulting in displacement of varying degree and direction. No specific arrangement of optical parameters or other properties is proposed herein as causing this precise shift, nor does the present invention require determining such cause. The present invention is not particularly limited by causes of visual variations, and indeed the reasons for any given visual variation need not necessarily even be known or considered. The present invention instead considers the viewer's perception of where things do in fact appear to be, thus a determination of where things should appear to be may be of little consequence. Such determination is not excluded from the present invention, however. The displacement shown in FIG. 7 is an example only, and the present invention is not limited only to displacements similar to that shown, or to any particular arrangement of optical parameters.

Figure 8:
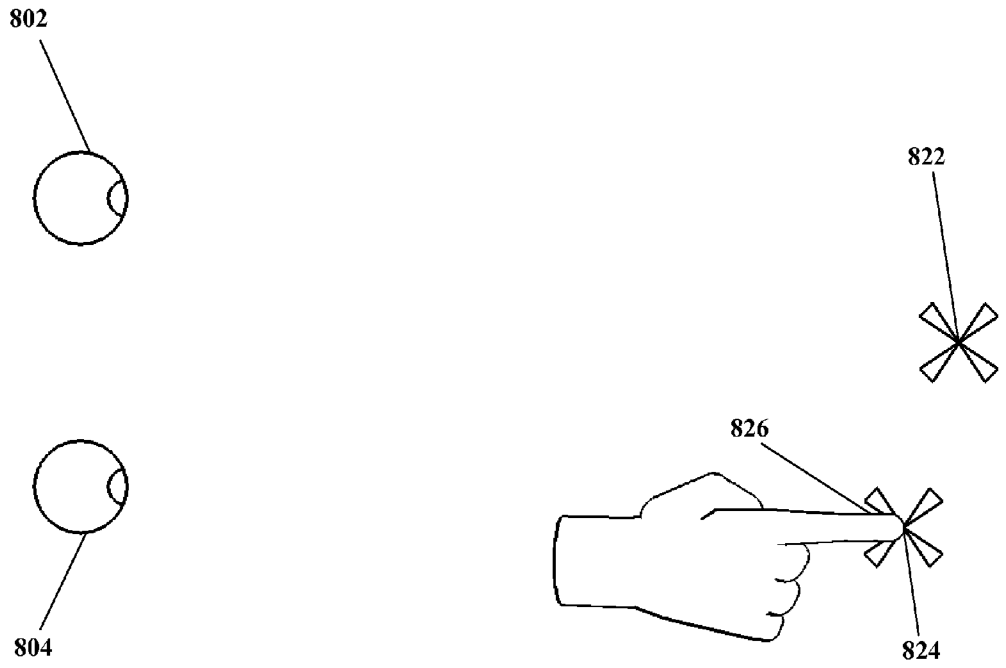

Moving on to FIG. 8, an example entity is shown outputted for viewing by a viewer at an ideal position 822 in three dimensional space, along with an apparent position 824 for the entity as perceived by the viewer with his or her eyes 802 and 804. In addition, an indication by the viewer is shown in the form of the viewer pointing with a fingertip 826 to the apparent position 824. The arrangement in FIG. 8 may be considered as at least somewhat similar to that represented by step 546 in FIG. 5.

The use of a fingertip 826 as shown in FIG. 8 to indicate the apparent position 824 is an example only. Other end effectors, such as a stylus, a pen, a hand with other postures, etc. may be equally suitable for indicating the apparent position 824. In addition, approaches other than the use of an end-effector also may be equally suitable.

Figure 9:
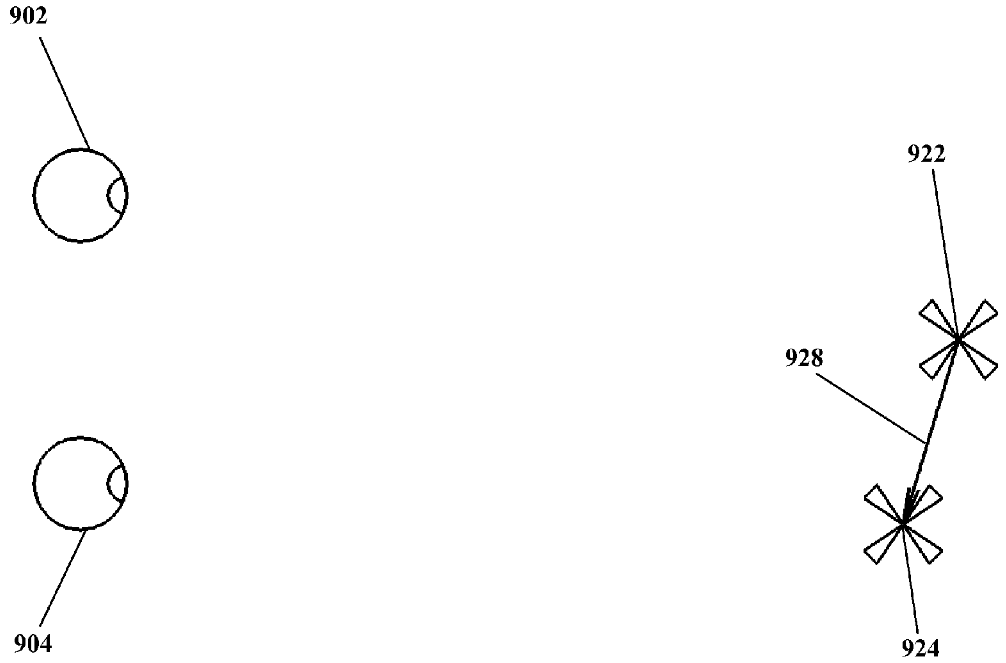

Turning to FIG. 9, therein is shown an example entity outputted at an ideal position 922 and an apparent position 924 for the entity as viewed by the viewer 902 and 904. In addition, a difference 928 between the ideal position 922 and apparent position 924 is shown. As previously noted and as visible in FIG. 9, the apparent position 924 is to the right of the ideal position 922 and closer to the viewer than the ideal position 922, as perceived by the viewer. The difference 928 shown in FIG. 9 is illustrated as a vector, representing the direction and magnitude of the shift or offset between the ideal position 922 and the apparent position 924. The arrangement in FIG. 9 may be considered as at least somewhat similar to that represented by step 548 in FIG. 5.

Although as illustrated the difference 928 is in the form of a two-dimensional vector, the present invention is not limited only two two-dimensional differences, nor is the present invention particularly limited with regard to how the difference is determined, expressed, etc. For simplicity, a two dimensional geometric vector is shown in FIG. 9, but other arrangements may be equally suitable.

Moving on to FIG. 10, again a viewer's eyes 1002 and 1004 are shown along with an example entity outputted at an ideal position 1022 and an apparent position 1024 for the entity. The difference 1028 between the ideal and apparent positions 1022 and 1024 is also shown, again as a two dimensional vector.

Figure 10:
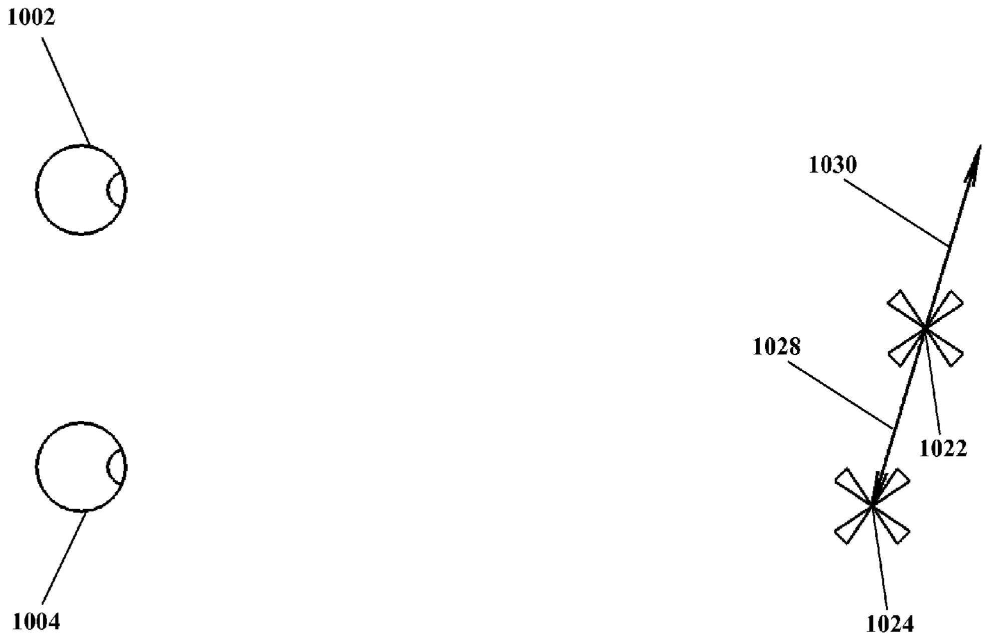

In addition, FIG. 10 shows a viewer adjustment 1030. The viewer adjustment 1030 is a position adjustment such that if the ideal position 1022 is adjusted with the viewer adjustment 1030, the apparent position of that adjusted ideal position is substantially similar to the (un-adjusted) ideal position 1022. That is, the apparent position of an ideal position in combination with the viewer adjustment is substantially similar to the ideal position absent the viewer adjustment.

More colloquially, the viewer adjustment 1030 "undoes" the effects of the difference 1028, such that a displayed entity appears to a viewer in the ideal position 1022. The viewer adjustment 1030 as shown is an opposing vector, in effect the opposite of the difference 1028. However, the present invention is not limited only to corrections that are geometrically, mathematically, or otherwise opposites of their respective differences. So long as the adjustment produces an affect according to the present invention, e.g. reducing and/or eliminating variation between where content is and where content is viewed by a viewer to be, the difference and/or viewer adjustment may vary considerably, and are not necessarily required to be exact opposites.

In principle, such an adjustment may be applied to the apparent position 1024 rather than the ideal position 1022. However, typically (though not necessarily) the ideal position may be more closely defined and/or controlled than the apparent position 1024. For example, the ideal position 1022 may be a position as calculated within a processor, while the apparent position 1024 is a position as perceived by the viewer. Even when the apparent position 1024 is indicated by the viewer (as shown for example in FIG. 8) the ideal position 1022 may be known with higher precision and/or confidence than the apparent position 1024 (e.g. due to error in the viewer indication of the apparent position 1024, uncertainty in the sensing of the viewer's indication, etc.). Thus typically the viewer adjustment 1030 is determined as applicable to the ideal position 1024. However, embodiments wherein a viewer adjustment is determined that would be applied to the apparent position 1022 are not excluded from the present invention.

As noted elsewhere herein, the specific parameters determining the apparent position 1022 as compared with the ideal position 1024 may be dependent upon the individual viewer. Thus, a viewer correction 1030 likewise may be specific to an individual viewer. Furthermore, a viewer correction 1030 may be specific to an individual time, individual conditions, etc.

Figure 11:
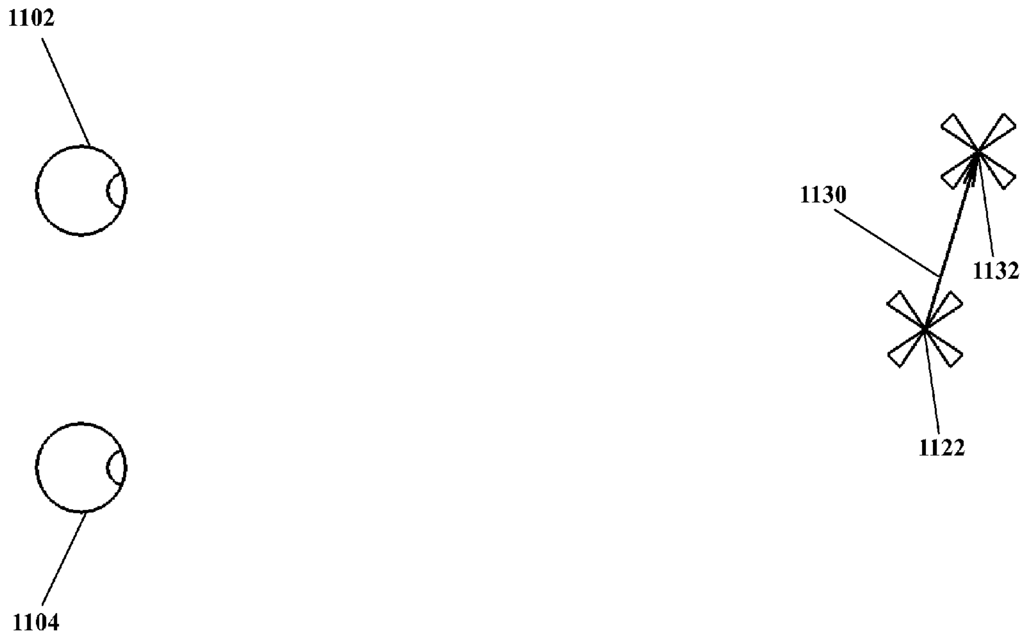

Turning to FIG. 11, a viewer's eyes 1102 and 1104 are shown along with an example entity outputted at an ideal position 1122. A viewer adjustment 1130 is also shown. As has been described, the viewer adjustment 1130 is adapted to be combined with the ideal position 1122, resulting in an adjusted ideal position 1132.

Figure 12:
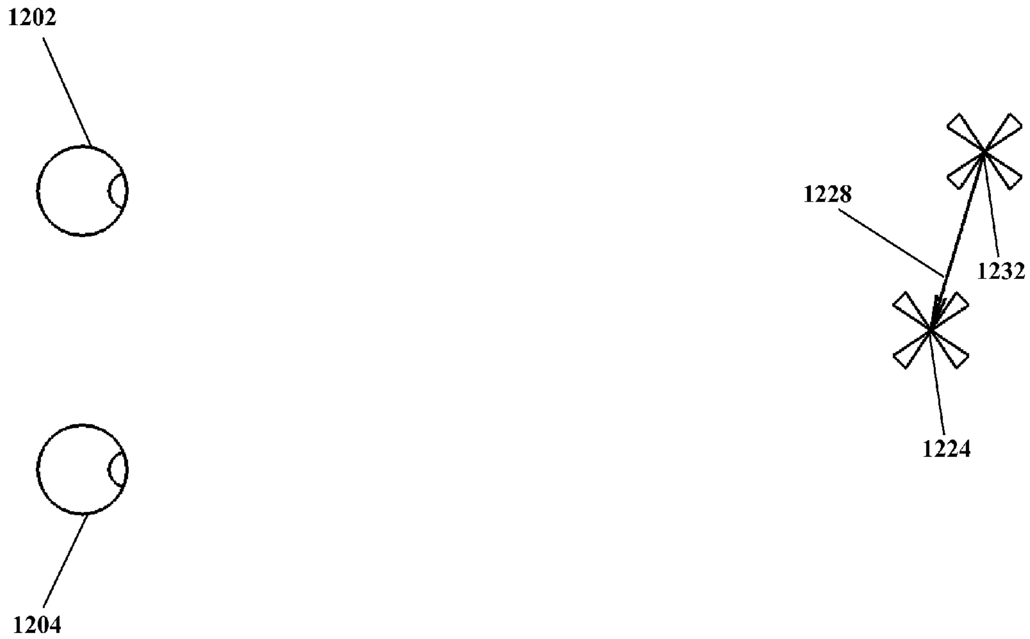

Now with reference to FIG. 12, a viewer's eyes 1202 and 1204 are shown along with the adjusted ideal position 1232 of an example entity. For an entity displayed in the adjusted ideal position 1232, the difference 1228 again may shift the entity as viewed by the viewer to an apparent position 1224. (The apparent position 1224 of the adjusted ideal position 1232 also may be referred to as the apparent adjusted ideal position, though for clarity the location at which a viewer perceives an entity in an adjusted ideal position 1232 is referred to herein simply as the apparent position. It is noted that the viewer may not even be aware that an adjustment has been applied to produce an adjusted ideal position 1232, thus to the viewer the apparent position 1224 of an adjusted ideal position 1232 may be simply the apparent position 1224.)

Figure 13:

In FIG. 13, a viewer's eyes 1302 and 1304 are again shown along with an example entity. The example entity is shown in a position corresponding to an adjusted ideal position, as perceived by the viewer. Thus the location of the example entity as shown is both the ideal position 1322 (as not adjusted) and the apparent position 1324 of the ideal position as adjusted. That is, the apparent position 1322 is the same as the ideal position 1324 (subsequent to application of an adjustment as previously described). This is an example only; as noted, perfect correction is not required for the present invention, thus the apparent position 1322 and the ideal position 1324 may not necessarily be exactly coincidental, though typically the apparent position 1322 and the ideal position 1324 may be substantially similar.

Figure 14:
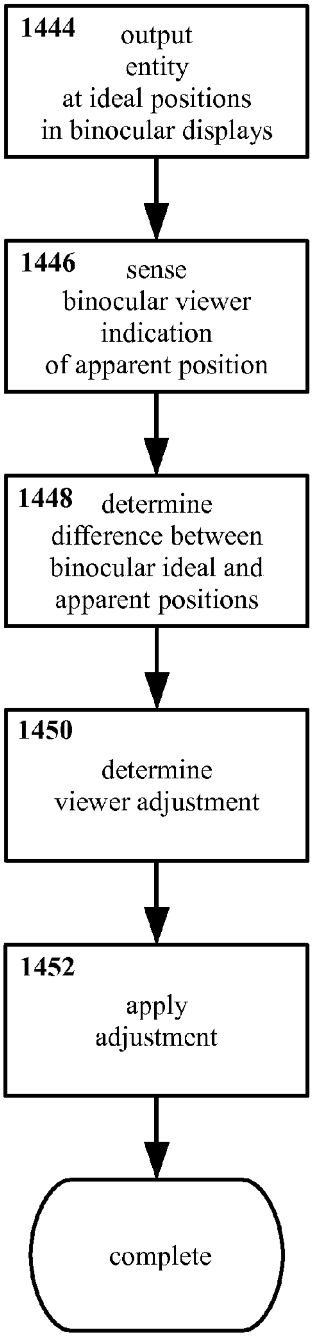
FIG. 14 shows another example method for individualized three dimensional display calibration according to the present invention, explicitly binocular in nature, in flow-chart form.

Turning now to FIG. 14, an example of a binocular method for calibrating a display system for an individual user is shown therein in flow-chart form. As noted above with regard to FIG. 5, methods according to the present invention may be binocular or monocular. That is, a viewer may indicate the apparent position of an entity, and that apparent position may be sensed, for either both eyes at the same time (binocular) or for one eye at a time (monocular). The arrangement of FIG. 5 does not specify either binocular or monocular method, rather being generic to both. FIG. 14 shows an explicitly binocular method, that is, a method wherein both of the viewer's eyes are considered together.

In the method shown in FIG. 14 an entity is outputted 1444 at an ideal position in binocular displays (e.g. left and right displays of a stereo display system). The entity is outputted 1444 so as to appear substantially simultaneously to both eyes of the viewer, such that the viewer perceives the entity and the entity's position in three dimensional space using binocular vision.

A binocular viewer indication of an apparent position is sensed 1446. That is, the viewer indicates where the entity appears in his or her binocular vision, i.e. as the entity appears to both eyes at the same time. Thus, a single indication identifies where the entity appears to the viewer to both his or her left and right eyes, that single indication is sensed 1446 for determining the apparent position as viewed by both of the user's eyes.

Typically though not necessarily, a viewer may indicate the apparent position of the entity by aligning an end-effector such as a fingertip with the entity, as substantially simultaneously viewed by both of the viewer's eyes.

Moving on in FIG. 14, a difference between the binocular ideal positions and the binocular apparent position is determined 1448. As noted, only a single three-dimensional apparent position is indicated. Typically two two-dimensional ideal positions are generated for binocular display, so two differences may be determined 1448. However, also typically the two two-dimensional ideal positions are derived from a single three-dimensional ideal position, so for certain embodiments only a single difference may be determined, and the present invention is not particularly limited in this regard.

A viewer-specific adjustment is determined 1450 for entities that are and/or will be displayed. That is, based on the difference determined in step 1448, a correction is determined such that where entities appear to the viewer and where those entities are intended to appear more closely match, i.e. applying the adjustment to the ideal position results in an apparent position that is substantially similar to the (non-adjusted) ideal position.

Continuing in FIG. 14, the adjustment is then applied 1452 to one or more entities being displayed. The adjustment may be applied 1452 to the entity that is used to determine the adjustment itself, or may be applied only to other entities. With the adjustment applied 1452, as described earlier the apparent position of the adjusted ideal position should be substantially similar or even identical to the non-adjusted ideal position.

Figure 15:
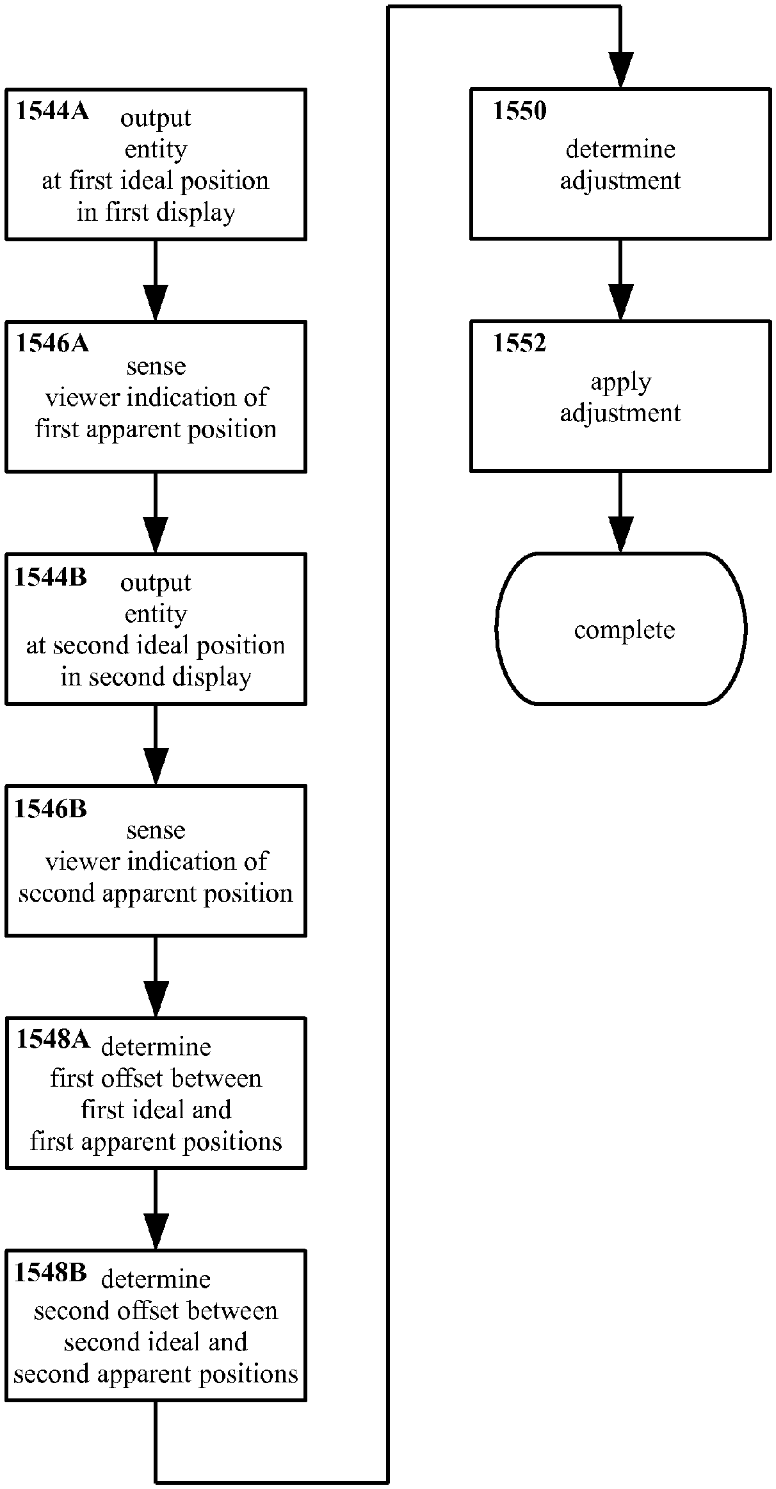
FIG. 15 shows another example method for individualized three dimensional display calibration according to the present invention, explicitly monocular in nature, in flow-chart form.

Turning now to FIG. 15, therein an example of a monocular method for calibrating a display system for an individual user is shown therein in flow-chart form. That is, in the method of FIG. 15 each of the viewer's eyes is considered separately.

In the method shown in FIG. 15 an entity is outputted 1544A at a first ideal position in a first display. The entity as outputted 1544A at its first ideal position thus is visible to a first of the viewer's eyes, but not to the second eye. Typically though not necessarily, the second display may be left blank, blacked out, partially darkened, reduced in contrast, or otherwise configured so that the viewer may more readily concentrate on the image in the first display without being distracted by information from the second display.

A viewer indication of the first apparent position is sensed 1546A. This is a monocular determination, that is, the viewer indicates where the entity appears in his or her vision for only one eye. Typically though not necessarily, the viewer may indicate the first apparent position by pointing to that position with a fingertip or other end-effector, though other arrangements may be equally suitable.

Continuing in FIG. 15, the entity is outputted 1544B at a second ideal position in a second display. The entity as outputted 1544B at its second ideal position thus is visible to a second of the viewer's eyes, but not to first second eye. Typically though not necessarily, the first display may be left blank, blacked out, partially darkened, reduced in contrast, or otherwise configured so that the viewer may more readily concentrate on the image in the second display without being distracted by information from the first display.

A viewer indication of the second apparent position is sensed 1546B. As with step 1546A above, step 1546B is a monocular determination, wherein the viewer indicates where the entity appears in his or her vision for only one eye (the other eye than in step 1546A). Typically though not necessarily, the viewer may indicate the second apparent position by pointing to that position with a fingertip or other end-effector, though other arrangements may be equally suitable.

As already noted, the present invention is not particularly limited with regard to how the viewer indicates apparent positions or how apparent positions are sensed. With regard to monocular indications, it is also noted that the viewer may indicate the first and second apparent positions differently. For example, a viewer may use one fingertip to indicate the first apparent position, and a different fingertip to indicate the second apparent position. Likewise, sensing the monocular indications 1546A and 1546B may be carried out in different ways for each sensing step 1546A and 1546B.

Also, for indication of a monocular first or second apparent position as in steps 1544A and 1544B, the viewer indications typically may be executed as two-dimensional position indications. For example, for a stereo display system using essentially two-dimensional displays, for each eye the output visible to the viewer is substantially two dimensional (even though the combined screens may produce a three-dimensional stereo effect) so that each indication of apparent position likewise may be substantially or entirely two-dimensional. Thus, at what distance the viewer indicates the first or second apparent position, e.g. by pointing with a fingertip, may for certain embodiments be ignored while still providing an ability to determine a three-dimensional apparent position by sensing apparent positions for both eyes (though one eye at a time rather than together). In other words, the viewer may not be required to accurately indicate a distance (or need not indicate a distance at all) for each apparent position, and the distance may need not need to be sensed accurately (or at all) when sensing each apparent position 1546A and 1546B.

Still with reference to FIG. 15, although for simplicity the entity outputted in steps 1544A and 1544B is referred to in the singular, as one entity, what is displayed in the first and second displays is not necessarily required to be identical for all embodiments of the present invention. For example, if the entity is three-dimensional, the perspective of that entity as shown in the first and second displays may be slightly different because displays are at slightly different positions. In such instance the appearance of the entity, as well as the position of the entity, may be slightly different for the first and second displays (and thus for the viewer's left and right eyes).

In addition, the present invention is not limited only to the use of a single entity for both the first and second displays. For certain embodiments, it may be equally suitable to display a first entity at a first ideal position in the first display, and a second (perhaps entirely different) entity at a second position in the second display.

Moving on in FIG. 15, a first difference is determined 1548A between the first ideal position and the first apparent position. Similarly, a second difference is determined 1548B between the second ideal position and the second apparent position.

A viewer-specific adjustment is determined 1550 for entities that are and/or will be displayed. That is, based on the first and second differences determined in steps 1548A and 1548B, a correction is determined such that where entities appear to the viewer and where those entities are intended to appear more closely match, i.e. applying the adjustment to the ideal position results in an apparent position that is substantially similar to the (non-adjusted) ideal position.

Although first and second ideal positions are outputted 1544A and 1544B, typically (though not necessarily) those first and second ideal positions are two dimensional positions that, in combination with a baseline between eyes (e.g. the inter-pupillary distance) triangulate a single three-dimensional ideal position. Thus, although there are also first and second apparent positions sensed in steps 1546A and 1546B, and first and second differences 1548A and 1548B, there may for at least certain embodiments be only a single adjustment. That is, the three-dimensional ideal position may be adjusted, rather than there being separate adjustments for the first and second (two-dimensional) ideal positions. (If the three-dimensional ideal position is adjusted, then two-dimensional first and second ideal positions derived therefrom likewise may be adjusted, even if not directly.)

Moving on in FIG. 15, the adjustment is then applied 1552 to the positions of one or more entities being displayed. The adjustment may be applied 1552 to the entity that is used to determine the adjustment itself, or may be applied only to other entities. With the adjustment applied 1552, as described earlier the apparent position of the adjusted ideal position should be substantially similar or even identical to the non-adjusted ideal position. Likewise, first and second apparent positions (two-dimensional) of entities derived from adjusted ideal positions (three-dimensional) also should be substantially similar or identical to their respective non-adjusted ideal positions.

As noted above with regard to FIG. 15, for at least certain embodiments only one three-dimensional adjustment may be determined (as in step 1550) and applied (as in step 1552). However, for at least certain embodiments, individual adjustments may be made for each of first and second ideal positions. That is, individual two-dimensional displayed positions on first and second displays may be adjusted individually, rather than adjusting a three-dimensional position (and relying on that adjustment to apply to individual two-dimensional first and second ideal positions derived therefrom). Such an arrangement is shown in FIG. 16.

Figure 16:
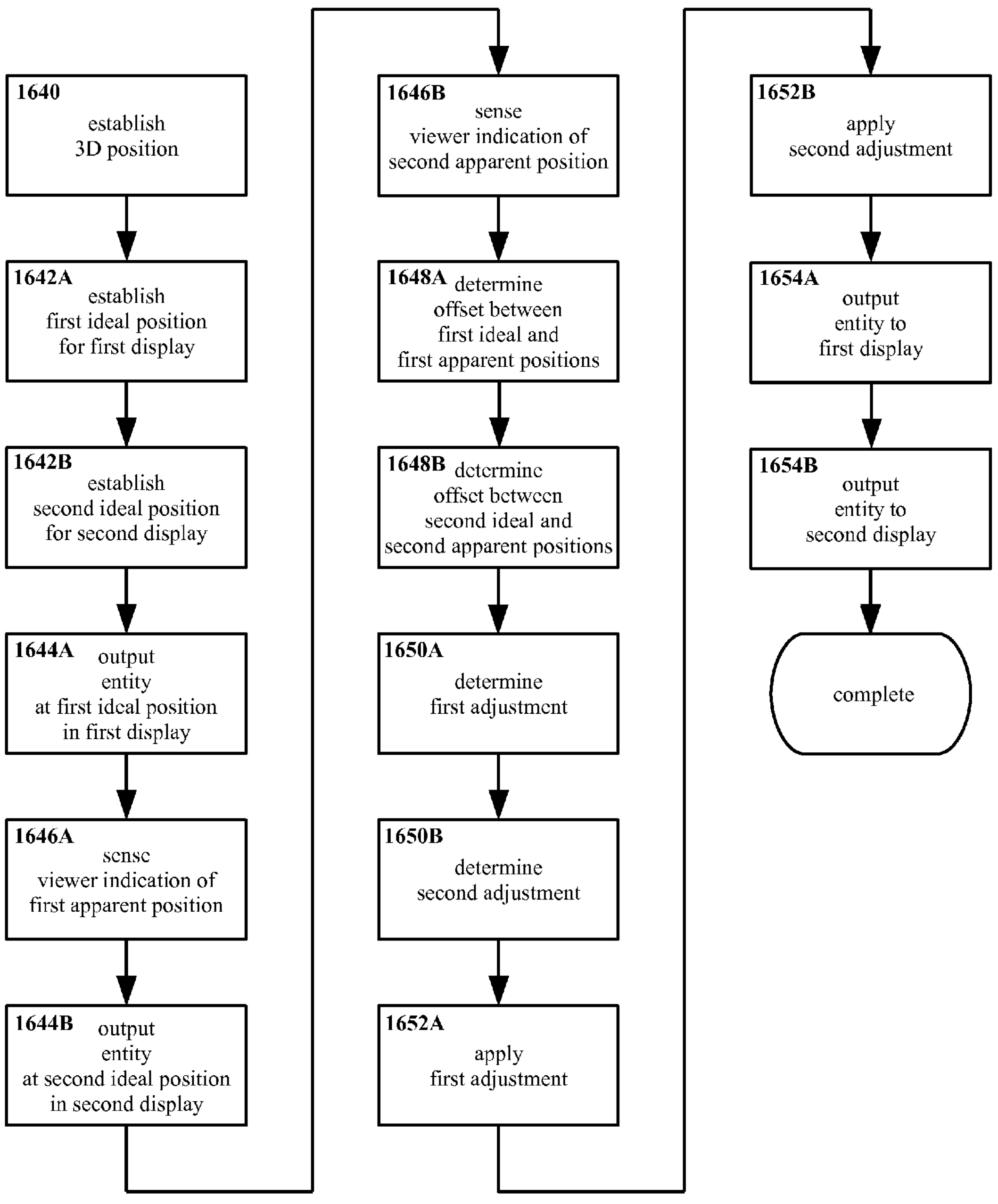
FIG. 16 shows another example method for individualized three dimensional display calibration according to the present invention, explicitly establishing positions and outputting entities, in flow-chart form.

With regard to FIG. 16, up to this point it has been assumed for simplicity that relevant positions and/or position information (e.g. a three-dimensional ideal position, two-dimensional first and second ideal positions, etc.) may already be available in some form. However, in FIG. 16 the establishing of such ideal positions is made explicit.

In FIG. 16 another example of a monocular method for calibrating a display system for an individual user is shown therein in flow-chart form.

A three-dimensional position is established 1640, e.g. for some virtual or agumented entity such as a test marker, etc., though other arrangements may be equally suitable.

The concept of establishing a position is to be considered broadly with regard to the present invention. It is noted that to "establish" something may, depending on particulars, refer to either or both the creation of something new (e.g. establishing a business, wherein a new business is created) and the determination of a condition that already exists (e.g. establishing the whereabouts of a person, wherein the location of a person who is already present at that location is discovered, received from another source, etc.). Similarly, establishing a position may encompass several potential approaches, including but not limited to the following.

Establishing a position may include measuring, approximating, etc. the position from existing positions, spatial relationships, etc., including but not limited to positions of physical objects, virtual objects, augmented objects, etc.

Establishing a position also may include creating or calculating the position without necessarily having a connection to existing spatial arrangements, e.g. a processor may execute instructions so as to compute or create a position in some fashion, whether from existing data, user inputs, internal algorithms, etc.

Establishing a position additionally may include selecting a previously-existing position, for example by reading position information from a data store, downloading a position from a communication link, or otherwise obtaining a position that already exists substantially in a form as to be utilized by some embodiment of the present invention.

The present invention is not particularly limited insofar as how a position may be established.

Continuing in FIG. 16, a first ideal position is established 1642A for a first display. A second ideal position also is established 1642B for a second display. First and second ideal positions have been described previously herein. As also described previously with regard to step 1640, the term "established" when applied to establishing first and second ideal positions should be understood broadly; first and second ideal positions may be received, calculated, created, etc., and the present invention is not particularly limited with regard to how the first and second ideal positions may be established 1642A and 1642B.

Continuing in FIG. 16, an entity is outputted 1644A at a first ideal position in a first display. The entity as outputted 1644A at its first ideal position thus is visible to a first of the viewer's eyes, but not to the second eye. Typically though not necessarily, the second display may be left blank, blacked out, partially darkened, reduced in contrast, or otherwise configured so that the viewer may more readily concentrate on the image in the first display without being distracted by information from the second display.

A viewer indication of the first apparent position is sensed 1646A. This is a monocular determination, that is, the viewer indicates where the entity appears in his or her vision for only one eye. Typically though not necessarily, the viewer may indicate the first apparent position by pointing to that position with a fingertip or other end-effector, though other arrangements may be equally suitable.

The entity is outputted 1644B at a second ideal position in a second display. The entity as outputted 1644B at its second ideal position thus is visible to a second of the viewer's eyes, but not to first second eye. Typically though not necessarily, the first display may be left blank, blacked out, partially darkened, reduced in contrast, or otherwise configured so that the viewer may more readily concentrate on the image in the second display without being distracted by information from the first display.

A viewer indication of the second apparent position is sensed 1646B. As with step 1646A above, step 1646B is a monocular determination, wherein the viewer indicates where the entity appears in his or her vision for only one eye (the other eye than in step 1646A). Typically though not necessarily, the viewer may indicate the second apparent position by pointing to that position with a fingertip or other end-effector, though other arrangements may be equally suitable.

Moving on in FIG. 16, a first difference is determined 1648A between the first ideal position and the first apparent position. Similarly, a second difference is determined 1648B between the second ideal position and the second apparent position.

A viewer-specific first adjustment is determined 1650A for entities that are and/or will be outputted to the first display. That is, based on the first difference determined in step 1648A, a correction is determined such that where entities appear to the viewer and where those entities are intended to appear more closely match, i.e. applying the adjustment to the ideal position results in an apparent position that is substantially similar to the (non-adjusted) ideal position.

A viewer-specific second adjustment likewise is determined 1650B for entities that are and/or will be outputted to the second display.

The first adjustment is then applied 1652A to the positions of one or more entities being outputted to the first display. The second adjustment is similarly applied 1652B to the positions of one or more entities that are to be outputted to the second display.

Still with reference to FIG. 16, an entity is outputted to the first display 1654A, with the first adjustment applied thereto. An entity is outputted to the second display 1654B, with the second adjustment applied thereto. Typically for a three dimensional display such as a stereo display, the same entity is outputted to the first and second displays 1654A and 1654B so as to produce the effect of the entity being positioned within three dimensional space. Thus although two outputs are generated (one to the first display and one to the second), the outputs collectively may be considered and/or processed as a single entity. However, arrangements wherein the outputs constitute a first entity outputted to the first display 1654A and a second entity outputted to the second display may be equally suitable.

The outputted entity or entities may include the original entity or entities for which the viewer indicated an apparent position. In such case the position of that entity as outputted may be adjusted. Alternately, the output adjustment may be applied to one or more additional entities without necessarily being applied to the original entity. That is, considering the original entity to be the first entity, the first entity may be outputted, a second entity may be outputted, and/or both the first entity and a second entity may be outputted.

As has been noted, embodiments of the present invention may be binocular and/or monocular. Binocular and monocular approaches each may have advantages for at least certain embodiments of the present invention.

For example, a binocular approach requires only one sighting and indication on the part of the viewer. Thus, from the perspective of a viewer a binocular approach may require less effort than a monocular approach (which requires two sightings and indications), may be less disruptive of ongoing work, etc. In addition, a binocular approach is direct, in the sense that the viewer identifies a three-dimensional point by making a three-dimensional indication (i.e. with both eyes at once).

Conversely, a monocular approach may require less precision on the part of the viewer. For a monocular approach, the viewer is not required to accurately perceive depth (which may for certain viewers be problematic); rather than indicating with a single action the apparent position of a target in three-dimensional space, the viewer may indicate two points in two-dimensional space. A monocular approach thus may, for at least certain embodiments, provide a determination of apparent position that is more accurate and/or more precise than a binocular approach.

Likewise, embodiments of the present invention may be explicit or implicit. That is, calibration according to the present invention may for certain embodiments be accomplished as steps that are identified to the viewer as being a calibration (explicit), and/or may be accomplished as steps that are not so identified.

Again, each approach may have advantages for certain embodiments. For example, explicit calibration may be useful for an arrangement wherein the degree of calibration (e.g. how much offset may be expected to exist between ideal and apparent positions) may reasonably be anticipated to be large, such as when first calibrating a system to a new viewer whose parameters are unknown. The viewer, being aware that he or she is executing calibration, may take special care to be accurate in indicating apparent positions, may be aware of and/or accommodate large offsets, may accept several repetitions of the method to comprehensively calibrate the system, etc.

Conversely, implicit calibration may for at least certain embodiments be made transparent to a viewer. For example, if a system is protected with a PIN or password, a viewer might be expected to "type" the PIN or password by aligning his or her fingertip with targets representing letters and numbers. As another example, a system might be activated by dragging an icon from an initial position to a specified position. Either arrangement (or many others within the scope of the present invention) provide opportunities to determine apparent positions as compared with ideal positions. Calibration thus may be integrated with some other useful function wherein the viewer communicates with the processor (e.g. entering a password), so that no additional time or concentration is required from the viewer beyond that of the communication itself. Such calibrations may be effectively invisible to the viewer, with no requirement for the viewer to dedicate additional time or effort to calibration.

In particular, it is noted that such implicit and/or transparent calibration may be executed repeatedly, and/or on an ongoing basis. As has been noted, the methods as described herein may be repeated. The methods of the present invention may indeed be carried out as part of the normal ongoing function of a system, for example when a viewer interacts with the system by gestures or other position indications, the offsets between apparent and ideal positions may be updated, refined, etc. Potentially every such interaction may be utilized as part of an ongoing, self-adjusting calibration process.

However, such arrangements are examples only. The present invention is not particularly limited with regard to monocular vs. binocular approaches (or other suitable approaches), explicit vs. implicit approaches (or other suitable options), repetition or lack of repetition, etc.

Having described several examples of methods for individualized three dimensional display calibration according to the present invention, at this time it may be useful to note that the present invention does not require measurement of the viewer's eyes, the optical properties thereof, etc. For example, the present invention does not require measurement or even approximation of the inter-pupillary distance of a particular viewer. Rather, the present invention relies upon the viewer's perception of where targets are positioned. While geometric and/or optical factors (and/or other parameters) such as inter-pupillary distance may be a contributing factor in where the viewer perceives various targets, measurement of such parameters is not required (though measurement also is not prohibited). As has been noted earlier herein comprehensively identifying and measuring all potentially relevant factors for the optical system of a viewer, or even identifying and measuring the most significant relevant factors, may be problematic. By contrast, the present invention does not require identification or measuring of such factors. The present invention takes advantage of the viewer indicating what he or she does in fact see, rather than necessarily analyzing or predicting (for example based on the viewer's particular optical parameters) what the viewer ought to see.

Thus, although optical measurement are not prohibited in the present invention, neither are optical measurements required in executing an individualized three dimensional display calibration according to the present invention.

Figure 17:
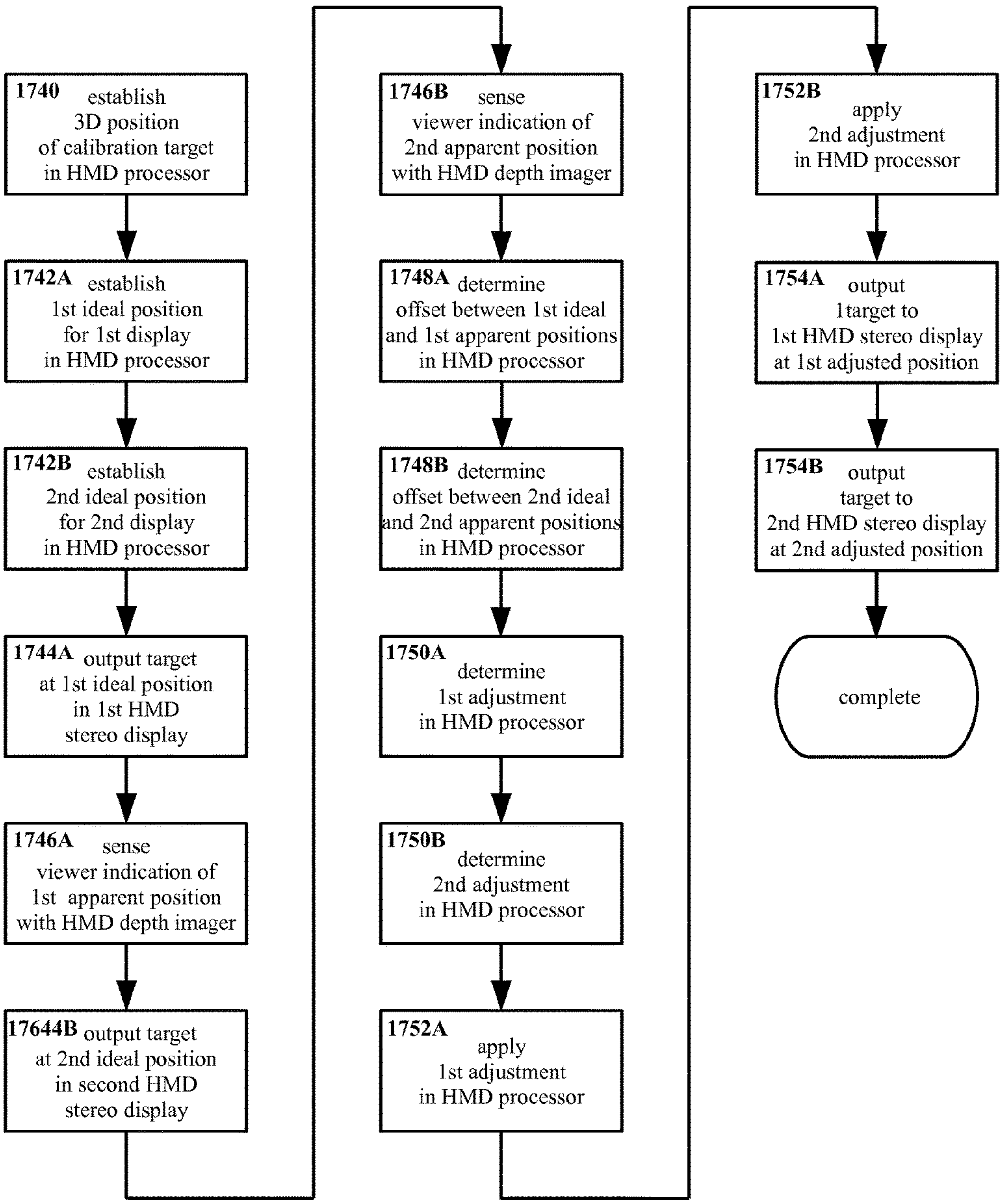
FIG. 17 shows another example method for individualized three dimensional display calibration according to the present invention, with example references to approaches for execution of steps thereof, in flow-chart form.

Turning now to FIG. 17, therein another example of a monocular method for calibrating a display system for an individual user is shown therein in flow-chart form. Except where otherwise indicated herein, the present invention is not particularly limited with regard to how steps thereof are carried out. However, for clarity FIG. 17 provides examples of certain approaches as may be suitable for at least some embodiments of the present invention. These approaches are examples only, and other approaches may be equally suitable. With reference to certain steps herein, alternatives also may be noted for explanatory purposes. Where alternatives are provided, it should be understood that description of some alternatives does not necessarily imply that other alternatives are unsuitable.

Furthermore, although FIG. 17 refers to a specific example of a monocular method according to the present invention, it may be understood that such concrete examples as shown in FIG. 17 may similarly apply to at least certain binocular and/or other arrangements according to the present invention.

The example of FIG. 17 refers to a head mounted display (or HMD). A head mounted display at least somewhat similar to that referenced in FIG. 17 is shown in FIG. 20 and described subsequently with regard thereto, with additional description of elements thereof (or at least suitable therefor) also shown in and described with regard to FIGS. 18, 19, and 21.

In the example method of FIG. 17, a three-dimensional position for a visual calibration target is determined 1740 in the processor of a head mounted display. Given such an arrangement, the position might be read from a data store, determined computationally using exectuable instructions instantiated on the processor, etc.

Although for the example of FIG. 17 the position is determined in the processor, e.g. through access to and/or manipulation of data, for at least some embodiments such positions may be determined partially and/or entirely with reference to physical objects. For example, a position of an augmented reality calibration target may be disposed with reference to some real-world object within the viewer's field of view, e.g. overlaid onto a physical object (whether at the same or a different apparent distance from the viewer), positioned adjacent a physical object, etc. In such case, sensor data such as images and/or other factors may be considered in making the determination 1740.

Continuing in FIG. 17, a first ideal position for the target in a first stereo display (e.g. left or right) of the HMD is determined 1742A in the HMD processor. A second ideal position for the target in a second stereo display of the HMD also is established 1742B in the HMD processor.

The target is outputted 1744A from the HMD processor at a first ideal position in a first stereo display of the HMD. The target as outputted 1744A at its first ideal position thus is visible to a first of the viewer's eyes, but not to the second eye. A viewer indication of the first apparent position is sensed 1746A with a depth imager on the HMD. For example, an image may be captured 1746A using a depth camera integrated into the HMD, showing the viewer's fingertip pointing to where the viewer sees the target in the first stereo display of the HMD. That image then may be evaluated (e.g. in the HMD processor) so as to determine the position of the viewer's fingertip in a format suitable for computation by the HMD processor in subsequent steps.

Moving on in FIG. 17, the target is outputted 1744B from the HMD processor at a second ideal position in a second stereo display of the HMD. The target as outputted 1744B at its second ideal position thus is visible to a second of the viewer's eyes, but not to the first eye. A viewer indication of the second apparent position is sensed 1746B with a depth imager on the HMD (potentially though not necessarily the same depth imager or other sensor used in step 1746A).

In the HMD processor, a first difference is determined 1748A between the first ideal position and the first apparent position. Also in the processor, a second difference is determined 1748B between the second ideal position and the second apparent position. Steps 1748A and 1748B may, for example, be performed computationally through the use of executable instructions instantiated on the processor.

Again in the HMD processor, a first adjustment is determined 1750A for the target as viewed in the first stereo display of the HMD, representing a correction such that where entities appear to the viewer and where those entities are intended to appear more closely match. This first adjustment also may be utilized for other entities that are and/or will be outputted to the first display. A second adjustment also is determined 1750B for the target as viewed in the second stereo display of the HMD.

The first adjustment is then applied 1752A in the HMD processor (e.g. computationally through the use of executable instructions instantiated thereon) to the position of the target as outputted to the first stereo display of the HMD. The first adjustment may be applied similarly to other entities being and/or to be outputted to the first display. The second adjustment also is applied 1752B in the HMD processor to the position of the target as outputted to the second stereo display of the HMD; the second adjustment likewise may be applied to other entities being and/or to be outputted to the second display.

Still with reference to FIG. 17, the target is outputted to the first stereo HMD display 1754A, with the first adjustment applied thereto. The target is outputted to the second stereo HMD display 1754B, with the second adjustment applied thereto. For the example of FIG. 17, then, the target as viewed by the viewer may appear to move from an initial ideal position to a subsequent adjusted position.

Figure 18:
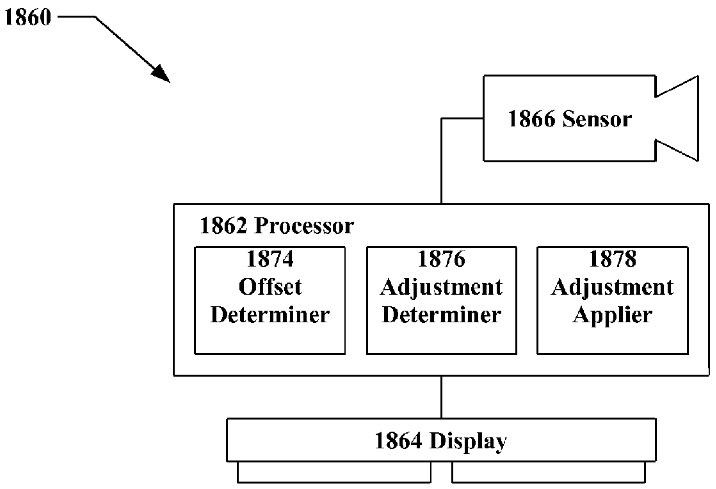
FIG. 18 shows an example apparatus for individualized three dimensional display calibration according to the present invention, in schematic form.

Turning now to FIG. 18, a schematic diagram of an embodiment of an apparatus 1860 for individualized three dimensional display calibration is shown therein.

The apparatus 1860 includes a processor 1862 adapted for executing executable instructions. The invention is not particularly limited with regard to the choice of processor 1862. Suitable data processors 1862 include but are not limited to digital electronic microprocessors. Although the processor 1862 is referred to in at least some places herein as a self-contained physical device for purposes of clarity, this is not required, and other arrangements may be suitable. For example, the processor 1862 may constitute two or more physical processors working cooperatively, a processing capability in a network without a well-defined physical form, etc.

The apparatus 1860 also includes a display 1864 in communication with the processor 1862. The display 1864 is adapted to output at least a first entity at an ideal position. Typically though not necessarily the display 1864 may be adapted to output many entities, and/or to output some or all of an augmented reality and/or virtual reality environment, e.g. as imagery to a user. However, this is an example only, and other arrangements may be equally suitable.

As illustrated, the display 1864 is a stereo display, with left and right screens adapted to output to the left and right eyes of a viewer. However this also is an example only. The present invention is not particularly limited with regard to the type of display 1864. Typically, although not necessarily, the display 1864 may be a visual display. In addition, the display 1864 may be a transparent or see-through display, wherein augmented reality information may be displayed in combination with real world information that may be viewed through the transparent display (though this does not necessarily exclude such a display obstructing or overwriting the entire field of view so as to display virtual reality information without passing real world information therethrough). Alternately, the display 1864 may be a "virtually" transparent display, wherein augmented reality information is visible thereon along with information from the real world that is actively displayed (e.g. having been captured with cameras) without the display necessarily being physically transparent.

The present invention is not particularly limited with regard to the display 1864. A range of devices may be suitable for use as the display 1864, including but not limited to light emitting diodes (LED), organic light emitting diodes (OLED), plasma screen panels (PDP), liquid crystal displays (LCD), etc. Likewise, the use of projected or transmitted displays, where the viewed surface is essentially a passive screen for an image projected or otherwise transmitted after being generated elsewhere, may also be suitable. Other arrangements including but not limited to systems that display images directly onto a user's eyes also may be equally suitable. Either digital or analog display technologies may be suitable. Furthermore, as noted the present invention is not limited only to the use of visual displays as a display 1864.

Still with reference to FIG. 18, the apparatus 1860 includes at least one sensor 1866 in communication with the processor 1862. The sensor 1866 is adapted to sense a viewer indication of the apparent position of the first entity. Typically though not necessarily, the sensor 1866 also may sense additional information, for example imaging some or all of the region surrounding the apparatus 1860. As a more concrete example, for an arrangement wherein the apparatus

1860 outputs to a viewer an augmented reality environment, the sensor 1866 may capture some or all of the real world information that is displayed and augmented within the augmented reality environment, in addition to that same sensor 1866 sensing viewer indications of ideal positions.

As shown, the sensor 1866 in FIG. 18 is illustrated as an imager such as a digital video camera, but this is an example only. The present invention is not particularly limited with regard to the sensor 1866, nor with how the sensor 1866 senses indications of ideal positions and/or other information. Suitable sensors 1866 may include but are not limited to imagers, depth sensors, structured light sensors, time-of-flight sensors, and ultrasonic sensors.

The apparatus 1860 includes several elements shown to be instantiated on the processor 1862. The aforementioned elements include an offset determiner 1874, an adjustment determiner 1876, and an adjustment applier 1878. Typically, the offset determiner 1874, adjustment determiner 1876, and adjustment applier 1878 include executable instructions and/or data, e.g. instantiated on the processor 1862, and in at least some embodiments the offset determiner 1874, adjustment determiner 1876, and adjustment applier 1878 may be composed exclusively of executable instructions and/or data, but this is an example only.

However, for purposes of clarity for the example embodiment shown in FIG. 18, the offset determiner 1874, adjustment determiner 1876, and adjustment applier 1878 may be referred to in at least some places herein as being composed of executable instructions and/or data instantiated on the processor 1862.

It is noted further that although the offset determiner 1874, adjustment determiner 1876, and adjustment applier 1878 are shown and described herein as being separate elements, this is done for clarity and should not be taken to limit the present invention. For at least some embodiments, one or more of the offset determiner 1874, adjustment determiner 1876, and adjustment applier 1878 may be combined with one another, and/or may be incorporated into some larger construct, e.g. a single program performing all functions thereof, a general operating system, etc. Furthermore, any or all of the offset determiner 1874, adjustment determiner 1876, and adjustment applier 1878 may be subdivided.

In the arrangement of FIG. 18, the offset determiner 1874 is adapted to determine an offset between an ideal position (typically though not necessarily provided by the processor 1862) and an apparent position (as sensed by the sensor 1866 from the viewer's indication). Typically though not necessarily the determination of offset is an arithmetical and/or geometric measurement and/or computation. Also typically the offset determiner 1874 may determine offsets in two dimensions and/or in three dimensions, though this may depend on the particulars of a given embodiment (e.g. a stereo display system might determine a single three dimensional position or a two dimensional position for each of the stereo displays), and other arrangements may be equally suitable. Ideal positions and apparent positions have been described previously herein.

The adjustment determiner 1876 is adapted to determine an output adjustment for the ideal position, such that the apparent position of the ideal position with the adjustment is substantially similar to the ideal position absent said adjustment. Typically though not necessarily the determination of adjustment is an arithmetical and/or geometric measurement and/or computation, based on the ideal position and offset (as determined by the offset determiner 1874). The adjustment determiner 1876, like the offset determiner 1874, may operate in two dimensions, in three dimensions, etc. Output adjustments have been described previously herein.

The adjustment applier 1878 is adapted to apply the output adjustment (as determined by the adjustment determiner 1876) to one or more entities to be outputted by the display 1864. This may include the original target, i.e. the entity for which the viewer indicated an apparent position, in which case the position of that entity as outputted may be adjusted. Alternately, the output adjustment may be applied to one or more additional entities without necessarily being applied to the target.

Figure 19:
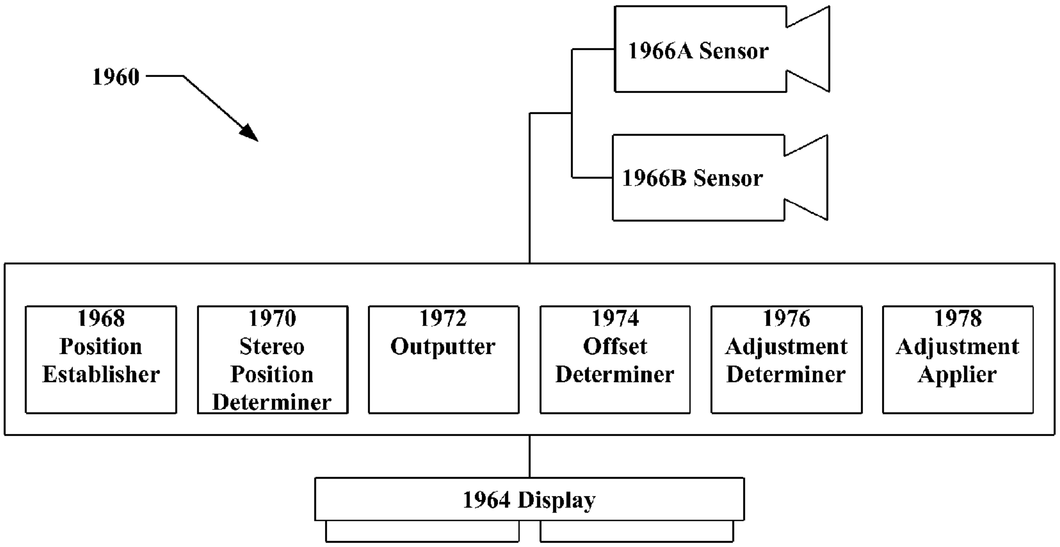
FIG. 19 shows another example apparatus for individualized three dimensional display calibration according to the present invention, in schematic form.
Figure 20:
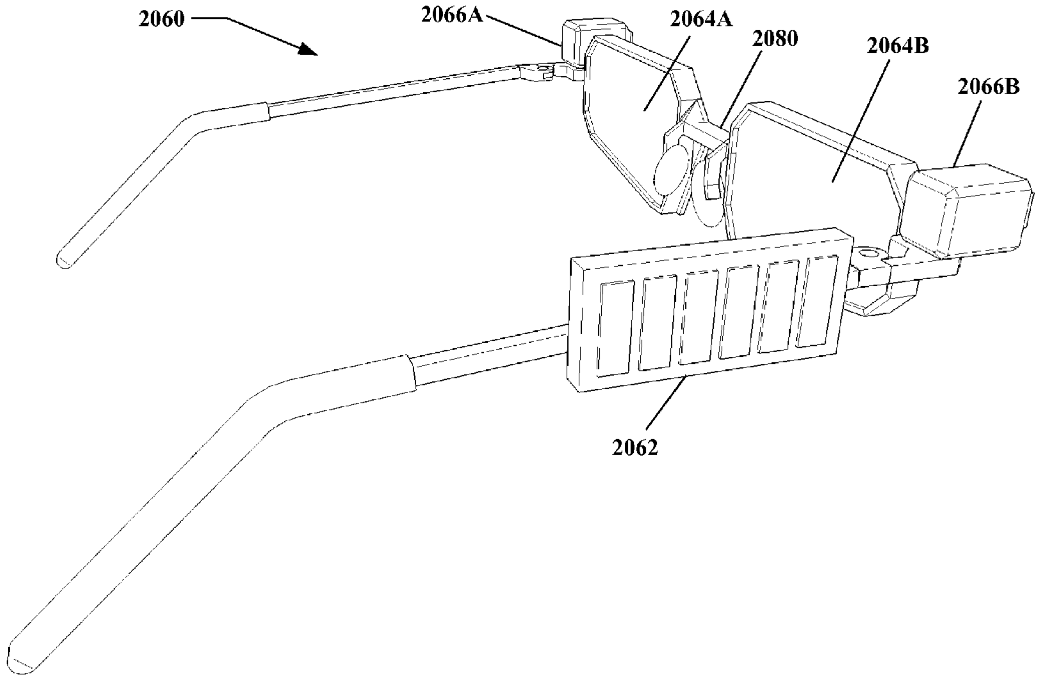
FIG. 20 shows another example apparatus for individualized three dimensional display calibration according to the present invention, in perspective view.

Turning to FIG. 19, therein is shown a schematic diagram of another embodiment of an apparatus 1960 for individualized three dimensional display calibration. The apparatus in FIG. 19 corresponds at least somewhat with the method shown in FIG. 16, in that the arrangement of FIG. 19 includes therein additional elements for establishing ideal positions as is shown in FIG. 16. In addition, the arrangement of FIG. 19 is adapted to address two separate two dimensional positions rather than one three dimensional position. Typically for a display such as a stereo display a pair of two dimensional positions are functionally equivalent to a single three dimensional position, but for certain embodiments it may be more convenient (e.g. computationally) to consider two dimensional positions rather than a three dimensional position for at least certain steps. Other arrangements also may be equally suitable.

The apparatus 1960 shown in FIG. 19 includes a processor 1962 and an outputter 1964. The apparatus also includes first and second sensors 1966A and 1966B in a stereo configuration, though this configuration is an example only and other arrangements may be equally suitable. The apparatus 1960 also includes an offset determiner 1974, an adjustment determiner 1976, and an adjustment applier 1978 instantiated on the processor 1962. These elements are at least somewhat similar to elements in FIG. 18 as already described.

In addition, the apparatus 1960 of FIG. 19 includes several further elements also shown to be instantiated on the processor 1962: a position establisher 1968, a stereo position determiner 1970, and an outputter 1972. Typically the position establisher 1968, stereo position determiner 1970, and outputter 1972 include executable instructions and/or data, e.g. instantiated on the processor 1962, and in at least some embodiments the position establisher 1968, stereo position determiner 1970, and outputter 1972 may be composed exclusively of executable instructions and/or data, but this is an example only. However, for purposes of clarity for the example embodiment shown in FIG. 19, the position establisher 1968, stereo position determiner 1970, and outputter 1972 may be referred to in at least some places herein as being composed of executable instructions and/or data instantiated on the processor 1962.

As noted with regard to elements 1874, 1876, and 1878 in FIG. 18, one or more of the position establisher 1968, stereo position determiner 1970, and outputter 1972 in FIG. 19 may be combined with one another, may be incorporated into some larger construct, and/or may be subdivided.

The position establisher 1968 is adapted to establish a substantially three-dimensional combined ideal position. Ideal positions and establishing positions have been described previously herein. Typically, the position establisher 1968 may establish a three dimensional ideal position by calculating that position, reading the position from a data store, receiving the position from a program such as one creating or operating a virtual or augmented reality environment, etc. However, other arrangements may be equally suitable.

The stereo position determiner 1970 is adapted to two dimensional or at least substantially two-dimensional first and second ideal positions for output to the stereo display 1964, for example a first ideal position for the left portion of the display 1964 (to be viewed by the left eye) and a second ideal position for the right portion of the display 1964 (to be viewed by the right eye), such that those two-dimensional first and second ideal positions at least substantially correspond with the three dimensional ideal position. That is, the first and second two dimensional ideal positions are such that, when viewed by a viewer, the first and second two dimensional stereo positions collectively appear as a single three dimensional position (i.e. the three dimensional combined ideal position).

The outputter 1972 is adapted to output a first target substantially to the first two dimensional ideal position in the display 1964, and a second target substantially to the second two dimensional ideal position in the display 1964. It is noted that although the stereo display 1964 in FIG. 19 is shown as an integral unit with two separate screens, for other embodiments it may be equally suitable to use two separate displays, to treat a single display logically as two units, to use a single screen with left and right images thereon, etc.

Still with reference to FIG. 19, an offset determiner 1974 is instantiated on the processor 1962. The offset determiner 1962 is adapted to determine offsets between the first and second two dimensional ideal positions and first and second apparent positions indicated by the viewer and sensed by the sensors 1966A and 1966B.

An adjustment determiner 1976 is instantiated on the processor 1962. The adjustment determiner 1976 is adapted to determine output adjustments for the first and second two dimensional ideal positions, such that the apparent positions of the first and second two dimensional ideal positions with their respective first and second adjustments are substantially similar to the first and second two dimensional ideal positions, respectively.

An adjustment applier 1978 also is instantiated on the processor 1962. The adjustment applier 1978 is adapted to apply the first and second output adjustments (as determined by the adjustment determiner 1976) to one or more entities to be outputted by the display 1964.

Turning now to FIG. 20, the present invention is not particularly limited with regard to form, and may be disposed on and/or incorporated into many shapes and/or other devices. Suitable configurations include but are not limited to the example shown in FIG. 20, wherein the present invention is illustrated in the form of a head mounted display resembling a pair of glasses.

As shown in FIG. 20, the example embodiment of the apparatus 2060 therein includes a body 2080 having a form similar to a pair of glasses, and adapted to be worn in a similar fashion. A processor 2062 adapted for executing executable instructions is disposed on the body 2080. Although not visible as distinct entities, the processor 2062 may support elements such as a position establisher, a stereo position determiner, an outputter, an offset determiner, an adjustment determiner, and an adjustment applier, e.g. in the form of executable instructions and/or data instantiated on the processor 2062.

The apparatus 2060 also includes sensors 2066A and 2066B disposed on the body 2080, illustrated in FIG. 20 as imagers in a stereo configuration, though these are examples only. The apparatus 2080 further includes displays 2064A and 2064B disposed on the body 2060, illustrated as left and right visual displays in a stereo configuration.

It is noted that in the configuration shown, the body 2060 is configured and sensors 2066A and 2066B are disposed thereon such that when the body 2060 is worn by a viewer, the sensors 2066A and 2066B would be substantially aligned with the lines of sight of the viewer's eyes, and could potentially encompass fields of view at least somewhat comparable to those of the viewer's eyes, assuming sensors 2066A and 2066B with fields of view similar in extent to those of the viewer. Such an arrangement might for example be suitable for receiving a viewer indication of an apparent position. Similarly, in the configuration shown the body 2060 is configured and the displays 2064A and 2064B are disposed thereon such that when the body 2060 is worn by a viewer, the displays 2064A and 2064B would be proximate to and substantially in front of the viewer's eyes, for example so as to output entities to a viewer.

However, it is emphasized that the arrangement in FIG. 20 is an example only, and that other arrangements may be equally suitable.

Figure 21:
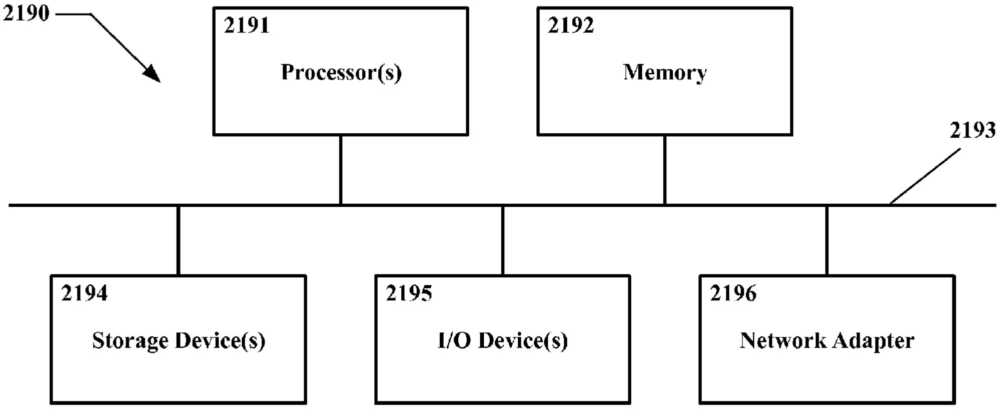
FIG. 21 shows a block diagram of a processing system that may implement operations of the present invention.

FIG. 21 is a block diagram of an apparatus that may perform various operations, and store various information generated and/or used by such operations, according to an embodiment of the disclosed technique. The apparatus may represent any computer or processing system described herein. The processing system 2190 is a hardware device on which any of the other entities, components, or services depicted in the examples of FIG. 1 through FIG. 20 (and any other components described in this specification) may be implemented. The processing system 2190 includes one or more processors 2191 and memory 2192 coupled to an interconnect 2193. The interconnect 2193 is shown in FIG. 20 as an abstraction that represents any one or more separate physical buses, point to point connections, or both connected by appropriate bridges, adapters, or controllers. The interconnect 2193, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 2191 is/are the central processing unit of the processing system 2190 and, thus, control the overall operation of the processing system 2190. In certain embodiments, the processor(s) 2191 accomplish this by executing software or firmware stored in memory 2192. The processor(s) 2191 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 2192 is or includes the main memory of the processing system 2190. The memory 2192 represents any form of random access memory (RAM), read-only memory (ROM), flash memory, or the like, or a combination of such devices. In use, the memory 2192 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

The network storage adapter 2194, a storage device(s) 2195, and I/O device(s) 2196, are also connected to the processor(s) 2191 through the interconnect 2193. The network adapter 2194 provides the processing system 2090 with the ability to communicate with remote devices over a network and may be, for example, an Ethernet adapter or Fibre Channel adapter. The network adapter 2194 may also provide the processing system 2190 with the ability to communicate with other computers within the cluster. In some embodiments, the processing system 2190 may use more than one network adapter to deal with the communications within and outside of the cluster separately.

The I/O device(s) 2196 can include, for example, a keyboard, a mouse or other pointing device, disk drives, printers, a scanner, and other input and/or output devices, including a display device. The I/O device(s) 2196 also may include, for example, cameras and/or other imagers adapted to accept visual input including but not limited to postures and/or gestures. The display device may include, for example, a cathode ray tube (CRT), liquid crystal display (LCD), or some other applicable known or convenient display device. The display device may take various forms, including but not limited to stereo displays suited for use in near-eye applications such as head mounted displays or other wearable devices.

The code stored in memory 2192 may be implemented as software and/or firmware to program the processor(s) 2191 to carry out actions described herein. In certain embodiments, such software or firmware may be initially provided to the processing system 2190 by downloading from a remote system through the processing system 2190 (e.g., via network adapter 2194).

The techniques herein may be implemented by, for example, programmable circuitry (e.g. one or more microprocessors) programmed with software and/or firmware, or entirely in special-purpose hardwired (non-programmable) circuitry, or in a combination of such forms. Special-purpose hardwired circuitry may be in the form of, for example, one or more AISCs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch, or bridge, or any machine capable of executing a set of instructions (sequential or otherwise) that specify actions to be taken by that machine.

A machine-accessible storage medium or a storage device(s) 2195 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, may include, for example, programmable circuitry programmed with specific software and/or firmware, special-purpose hardwired circuitry, or a combination thereof.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. A method, comprising:

defining, by a processor, a first coordinate in three-dimensional (3D) space to display a virtual object to a viewer, wherein the three-dimensional space is an augmented reality environment or a virtual reality environment;

displaying, by a display, the virtual object at the first coordinate in the 3D space;

sensing, by a sensor, an end-effector interacting with the virtual object when the virtual object is displayed at the first coordinate;

determining, by the processor, that the end-effector is pointing to a second coordinate in the 3D space that is different than the first coordinate where the virtual object is displayed;

determining, by the processor, an offset value between the first coordinate where the virtual object is located and the second coordinate where the end-effector is pointing to, wherein the offset value indicates a difference in a first coordinate and the second coordinate;

determining, by the processor, a third coordinate in the 3D space, wherein the third coordinate is the first coordinate of the first coordinate adjusted by the offset value so that the viewer perceives the virtual object as being located at the first coordinate in the 3D space;

displaying, by the display, the virtual object at the third coordinate in the 3D space;

sensing, by the sensor, the end-effector interacting with the virtual object when the virtual object is displayed at the third coordinate;

determining, by the processor, whether the end-effector is pointing to the first coordinate in the 3D space when the virtual object is displayed at the third coordinate;

in response to the end-effector pointing to the first coordinate in the 3D space, continuing to display the virtual object at the third coordinate; and in response to the end-effector pointing to a coordinate in the 3D space that is not the first coordinate, iteratively adjusting, by the processor, a coordinate that the virtual object is displayed at until the end-effector points to the first coordinate.

2. The method of claim 1, wherein displaying the virtual object as the first coordinate further comprises displaying the virtual object to a first display and a second display of a stereo display pair.

3. The method of claim 1, wherein displaying the virtual object in the first coordinate further comprises:

displaying the virtual object at a first location at a first display of a stereo display pair; and displaying the virtual object in a second location at a second display of the stereo display pair.

4. The method of claim 2, wherein the first coordinate is a first two-dimensional coordinate and the second coordinate is a second two dimensional coordinate.

5. The method of claim 1, wherein displaying the first virtual object at the first coordinate comprises:

displaying the virtual object at a first location to a first eye of the viewer but not a second eye of the viewer; and displaying the virtual object at a second location to the second eye of the viewer but not the first eye of the viewer.

6. The method of claim 5, wherein displaying the virtual object at the first coordinate further comprises displaying the virtual object substantially simultaneously to the first eye and the second eye.

7. The method of claim 5, wherein displaying the virtual object at the first coordinate further comprises displaying the virtual object sequentially to the first eye and the second eye.

8. The method of claim 7, wherein displaying the virtual object at the first coordinate further comprises:

displaying substantially nothing to the second eye while displaying the virtual object to the first eye; and displaying substantially nothing to the first eye while displaying the virtual object to the second eye.

9. The method of claim 7, wherein displaying the virtual object at the first coordinate further comprises:

substantially obstructing the second eye while displaying the virtual object to the first eye; and substantially obstructing the first eye while displaying the virtual object to the second eye.

10. The method of claim 1, wherein determining that the viewer perceives the virtual object as being located at the second coordinate that is different than the first coordinate in the 3D space further comprises sensing at least one of a posture or a gesture of the viewer.

11. The method of claim 1, wherein determining that the viewer perceives the virtual object as being located at the second coordinate that is different than the first coordinate in the 3D space further comprises sensing, by the sensor, the viewer substantially aligning an end-effector with the second location of the virtual object.

12. The method of claim 6, wherein determining that the viewer perceives the virtual object as being located at the second coordinate that is different than the first coordinate in the 3D space further comprises:

sensing, by the sensor, the viewer substantially aligning a first end-effector with the first coordinate of the virtual object; and sensing, by the sensor, the viewer substantially aligning the first end-effector with the second coordinate of the virtual object, substantially simultaneously to the viewer substantially aligning the first end-effector with the first coordinate of the virtual object.

13. The method of claim 7, wherein determining that the viewer perceives the virtual object as being located at the second coordinate that is different than the first coordinate in the 3D space further comprises:

sensing, by the sensor, the viewer substantially aligning a first end-effector with the first coordinate of the virtual object; and sensing, by the sensor, the viewer substantially aligning the first end-effector with the second coordinate of the virtual object.

14. The method of claim 7, wherein determining that the viewer perceives the virtual object as being located at the second coordinate that is different than the first coordinate in the 3D space further comprises:

sensing, by the sensor, the viewer substantially aligning a first end-effector with the first coordinate of the virtual object; and sensing, by the sensor, the viewer substantially aligning a second end-effector with the second coordinate of the virtual object.

15. The method of claim 1, wherein the virtual object comprises at least one of a virtual reality object or an augmented reality object.

16. The method of claim 1, comprising outputting the virtual object to a stereo display.

17. The method of claim 1, comprising outputting the virtual object to a see-through display.

18. The method of claim 1, wherein determining that the viewer perceives the virtual object as being located at the second coordinate that is different than the first coordinate in the 3D space further comprises determining that the viewer perceives the virtual object as being located at the second coordinate that is different than the first coordinate in the 3D space through stereo imaging.

19. The method of claim 1, wherein determining that the viewer perceives the virtual object as being located at the second coordinate that is different than the first coordinate in the 3D space further comprises determining that the viewer perceives the virtual object as being located at the second coordinate that is different than the first coordinate in the 3D space through depth imaging.

20. The method of claim 1, wherein determining that the viewer perceives the virtual object as being located at the second coordinate that is different than the first coordinate in the 3D space further comprises receiving a viewer communication.

21. The method of claim 20, wherein the viewer communication comprises at least one of:

activating a device in communication with the processor;

activating a data entity comprising executable instructions instantiated by the processor;

waking the device in communication with the processor;

waking the data entity comprising executable instructions instantiated by the processor;

unlocking the device in communication with the processor;

unlocking the data entity comprising executable instructions instantiated by the processor;

addressing the device in communication with the processor;

addressing the data entity comprising executable instructions instantiated by the processor;

identifying a user of the device in communication with the processor;

identifying the user of the data entity comprising executable instructions instantiated by the processor;

entering a security verification for the device in communication with the processor; and entering the security verification for the data entity comprising executable instructions instantiated by the processor.

22. A method, comprising:

defining, by a processor, a first coordinate in an augmented reality environment or a virtual reality environment to display a first virtual object to a viewer;

displaying, by a display, the first virtual object at the first coordinate in the augmented reality environment or the virtual reality environment;

sensing, by a sensor, an end-effector interacting with the virtual object when the virtual object is displayed at the first coordinate;

determining, by the processor, that the end-effector is pointing to a second coordinate in the 3D space that is different than the first coordinate where the virtual object is displayed;

determining, by the processor, an offset value between the first coordinate where the virtual object is located and the second coordinate where the end-effector is pointing to, wherein the offset value indicates a difference in a first coordinate and the second coordinate determining, by the processor, a third coordinate in the augmented reality environment or the virtual reality environment, wherein the third coordinate is the first coordinate of the first coordinate adjusted by the offset value so that the viewer perceives the virtual object as being located at the first coordinate in the augmented reality environment or the virtual reality environment;

generating a second virtual object that is different than the first virtual object;

defining, by the processor, a fourth coordinate in the augmented reality environment or the virtual reality environment to display the second virtual object to the viewer;

adjusting the fourth coordinate that the second virtual object is displayed at based on the offset value;

displaying, by the display, the first virtual object at the first coordinate in the augmented reality environment or the virtual reality environment; and displaying the second virtual object at the adjusted fourth coordinate.

23. The method of claim 22, comprising sequentially displaying the first virtual object and the second virtual object.

24. The method of claim 22, comprising:

displaying the first virtual object by a first display while outputting substantially nothing by a second display; and displaying the second virtual object by the second display while outputting substantially nothing by the first display.

25. The method of claim 22, comprising:

displaying the first virtual object by a first display while substantially obstructing a second display; and displaying the second virtual object by the second display while substantially obstructing the first display.

26. The method of claim 22, further comprising sensing a viewer first indication of the first virtual object and a viewer second indication of the second virtual object.

27. The method of claim 22, wherein displaying the first virtual object and the second virtual object at the third coordinate further comprises displaying the first virtual object by a first display and substantially simultaneously displaying the second virtual object by a second display.

28. The method of claim 22, wherein determining that the viewer perceives the first virtual object as being located at the second coordinate further comprises sensing substantially simultaneous a perceived location of the first virtual object and the second virtual object.

29. The method of claim 22, wherein determining that the viewer perceives the first virtual object as being located at the second coordinate further comprises sensing at least one of a viewer posture or a viewer gesture.

30. The method of claim 22, wherein determining that the viewer perceives the first virtual object as being located at the second coordinate further comprises sensing a first end-effector aligning with the second coordinate of the first virtual object.

31. The method of claim 30, wherein determining that the viewer perceives the first virtual object as being located at the second coordinate further comprises sensing the viewer substantially aligning the first end-effector with the second coordinate of the first virtual object and substantially simultaneously sensing the viewer substantially aligning the first end-effector with the first coordinate of the first virtual object.

32. The method of claim 30, wherein determining that the viewer perceives the first virtual object as being located at the second coordinate further comprises:

sensing the viewer substantially aligning the first end-effector with the first coordinate of the first virtual object; and sensing the viewer substantially aligning the first end-effector with the second coordinate of the first virtual object.

33. The method of claim 30, wherein determining that the viewer perceives the first virtual object as being located at the second coordinate further comprises:

sensing the viewer substantially aligning the first end-effector with the first coordinate of the first virtual object; and sensing the viewer substantially aligning a second end-effector with the second coordinate of the first virtual object.

34. The method of claim 30, wherein determining that the viewer perceives the first virtual object as being located at the second coordinate further comprises:

sensing the viewer substantially aligning the first end-effector with the first coordinate of the first virtual object; and sensing the viewer substantially aligning the first end-effector with the second coordinate of the first virtual object substantially simultaneously to the viewer substantially aligning the first end-effector with the first coordinate of the first virtual object.

35. The method of claim 22, wherein the first virtual object comprises at least one of a virtual reality object or an augmented reality object.

36. The method of claim 22, wherein the display comprises a see-through display.

37. The method of claim 22, wherein determining that the viewer perceives the first virtual object as being located at the second coordinate that is different than the first coordinate in the augmented reality environment or the virtual reality environment further comprises determining that the viewer perceives the first virtual object as being located at the second coordinate that is different than the first coordinate in the augmented reality environment or the virtual reality environment through stereo imaging.

38. The method of claim 22, wherein determining that the viewer perceives the first virtual object as being located at the second coordinate that is different than the first coordinate in the augmented reality environment or the virtual reality environment further comprises determining that the viewer perceives the first virtual object as being located at the second coordinate that is different than the first coordinate in the augmented reality environment or the virtual reality environment through depth imaging.

39. An apparatus comprising:

a first three-dimensional (3D) display operable to output a virtual object at a first coordinate in three-dimensional (3D) space to a first eye of a viewer;

a second 3D display operable to output the virtual object at a second coordinate in the 3D space to a second eye of the viewer, wherein the first coordinate is different than the first coordinate;

a first sensor configured to measure the first coordinate of an end-effector interacting with the virtual object relative to the first eye when the virtual object is displayed at the first coordinate;

a second sensor configured to measure the second coordinate of the end-effector interacting with the virtual object relative to the second eye when the virtual object is displayed at the second coordinate;

a processor coupled to the first 3D display, the second 3D display, the first sensor, and the second sensor, wherein the processor is configured to:

determine that the end-effector is pointing to a third coordinate on the first 3D display that is different than the first coordinate where the virtual object is displayed;

determine that the end-effector is pointing to a fourth coordinate on the second 3D display that is different than the second coordinate where the virtual object is displayed;

determine a first offset value between the first coordinate where the virtual object is located and the third coordinate where the end-effector is pointing to on the first display, wherein the first offset value indicates a difference in the first coordinate and the third coordinate;

determine a second offset value between the second coordinate where the virtual object is located and the fourth coordinate where the end-effector is pointing to on the second display, wherein the second offset value indicates a difference in the second coordinate and the fourth coordinate;

determine a fifth coordinate in the 3D space, wherein:

the fifth coordinate is the first coordinate adjusted by the first offset value so that the viewer perceives the virtual object as being located at the first coordinate on the first 3D display;

the first 3D display is to display the virtual object at the fifth coordinate on the first 3D display; and determine a sixth coordinate in the 3D space, wherein:

the sixth coordinate is the second coordinate adjusted by the second offset value so that the viewer perceives the virtual object as being located at the second coordinate on the second 3D display; and the second 3D display is to display the virtual object at the sixth coordinate on the second 3D display.

40. The apparatus of claim 39, wherein the first 3D display comprises a stereo display.

41. The apparatus of claim 39, wherein the first 3D display comprises a see-through display.

42. The apparatus of claim 39, wherein the first sensor or the second sensor comprises an imager.

43. The apparatus of claim 39, wherein the first sensor or the second sensor comprises a stereo imager pair.

44. The apparatus of claim 39, wherein the first sensor or the second sensor comprises a depth imager.

45. The apparatus of claim 39, wherein the processor, the display, and the sensor are disposed on a head-mounted display.

46. An apparatus, comprising:

a stereo display pair comprising a first display to display a virtual object to a first eye of a viewer at a first coordinate of the first display and a second display to display the virtual object to a second eye of the viewer at a second coordinate of the second display;

a sensor configured to:

measure the first coordinate an end-effector interacting with the virtual object relative to the first eye of when the virtual object is displayed at the first coordinate;

measure the second coordinate of the end-effector interacting with the virtual object relative to the second eye when the virtual object is displayed at the second coordinate; and a processor coupled to the stereo display and the sensor, wherein the processor is configured to:

determine that the end-effector is pointing to a third coordinate on the first 3D display that is different than the first coordinate where the virtual object is displayed;

determine that the end-effector is pointing to a fourth coordinate on the second 3D display that is different than the second coordinate where the virtual object is displayed;

determine a first offset value between the first coordinate where the virtual object is located and the third coordinate where the end-effector is pointing to on the first display, wherein the first offset value indicates a difference in the first coordinate and the third coordinate;

determine a second offset value between the second coordinate where the virtual object is located and the fourth coordinate where the end-effector is pointing to on the second display, wherein the second offset value indicates a difference in the second coordinate and the fourth coordinate, and simultaneously adjust the first coordinate by the first offset value and the second coordinate by the second offset value such that the first display and the second display simultaneously display the virtual object at the adjusted first coordinate and the adjusted second coordinate, respectively.

47. The apparatus of claim 46, wherein the first display and the second display comprise see-through displays.

48. The apparatus of claim 46, wherein the sensor comprises an imager.

49. The apparatus of claim 46, wherein the sensor comprises a stereo imager pair.

50. The apparatus of claim 46, wherein the sensor comprises a depth imager.

51. The apparatus of claim 46, wherein at least one of the virtual object is a calibration object.

52. The apparatus of claim 46, wherein the processor is further to combine the virtual object to form a 3D object.

* * * * *